US009866557B2

(12) United States Patent
Lindheimer et al.

(10) Patent No.: US 9,866,557 B2
(45) Date of Patent: Jan. 9, 2018

(54) METHOD AND NODES FOR AUTHORIZING NETWORK ACCESS

(71) Applicant: Telefonaktiebolaget L M Ericsson (publ), Stockholm (SE)

(72) Inventors: Christofer Lindheimer, Linkoping (SE); Jari Vikberg, Jarna (SE); Ruben Cantano Requena, Madrid (ES); Ping Chen, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 211 days.

(21) Appl. No.: 14/412,537

(22) PCT Filed: Dec. 19, 2014

(86) PCT No.: PCT/EP2014/078752
§ 371 (c)(1),
(2) Date: Jan. 2, 2015

(87) PCT Pub. No.: WO2015/139796
PCT Pub. Date: Sep. 24, 2015

(65) Prior Publication Data
US 2016/0149916 A1 May 26, 2016

Related U.S. Application Data

(60) Provisional application No. 61/955,476, filed on Mar. 19, 2014.

(51) Int. Cl.
*G06F 7/04* (2006.01)
*H04L 29/06* (2006.01)
(Continued)

(52) U.S. Cl.
CPC ...... *H04L 63/0892* (2013.01); *H04L 63/0492* (2013.01); *H04L 63/0876* (2013.01);
(Continued)

(58) Field of Classification Search
CPC ............ H04L 63/0492; H04L 63/0876; H04L 63/0892; H04L 63/162; H04L 63/18;
(Continued)

(56) References Cited

U.S. PATENT DOCUMENTS

| | | | |
|---|---|---|---|
| 6,795,701 B1 * | 9/2004 | Baker | H04L 63/08 370/395.52 |
| 7,738,488 B2 * | 6/2010 | Marsico | H04L 63/0892 370/315 |

(Continued)

FOREIGN PATENT DOCUMENTS

| | | |
|---|---|---|
| WO | 2006/031927 A2 | 3/2006 |
| WO | 2006/055986 A2 | 5/2006 |

OTHER PUBLICATIONS

Ericssion, "Handover between UMTS and GSM for packet switched services, revised 174" Document for Inclusion in 23.20, Apr. 1999.*

(Continued)

*Primary Examiner* — Samson Lemma
(74) *Attorney, Agent, or Firm* — Rothwell, Figg, Ernst & Manbeck, p.c.

(57) ABSTRACT

The embodiments herein relate to a method performed by an AAA server (103) for enabling authorization of a wireless device (101) to access a first network (100a) while simultaneously accessing a second network (100b) which the wireless device (101) is currently accessing. The AAA server (103) determines that the wireless device (101) requests access to the first network (100a). The AAA server (103) transmits, to a HLR (105), information associated with the first network (100a). The AAA server (103) receives, from the HLR (105), network profile data associated with the wireless device (101). Based on the received informa- (Continued)

tion, the AAA server (103) authorizes the wireless device (101) to access the first network (100a).

46 Claims, 11 Drawing Sheets

(51) Int. Cl.
  *H04W 12/06* (2009.01)
  *H04W 12/08* (2009.01)
  *H04W 84/18* (2009.01)
  *H04W 84/12* (2009.01)
(52) U.S. Cl.
  CPC ............ *H04L 63/162* (2013.01); *H04L 63/18* (2013.01); *H04W 12/06* (2013.01); *H04W 12/08* (2013.01); *H04W 84/18* (2013.01); *H04W 84/12* (2013.01)
(58) Field of Classification Search
  CPC ..... H04W 12/06; H04W 12/08; H04W 84/12; H04W 84/18
  USPC ............................................................. 726/4
  See application file for complete search history.

(56) References Cited

U.S. PATENT DOCUMENTS

| | | | | |
|---|---|---|---|---|
| 2003/0129991 A1* | 7/2003 | Allison | ................ | H04Q 3/0025 455/456.1 |
| 2004/0162998 A1* | 8/2004 | Tuomi | .................. | H04L 63/083 726/3 |
| 2006/0133319 A1* | 6/2006 | Kant | ....................... | H04L 63/10 370/331 |
| 2009/0298467 A1* | 12/2009 | Zohar | ................. | H04L 63/0884 455/411 |
| 2010/0197272 A1* | 8/2010 | Karaoguz | ........... | H04L 63/0815 455/411 |
| 2014/0148129 A1* | 5/2014 | Lundstrom | ............. | H04W 8/26 455/411 |
| 2015/0172315 A1* | 6/2015 | Hirst | ................... | H04L 63/0861 726/5 |

OTHER PUBLICATIONS

Deng et. al., "Practical Unified Authentication for 3G-WLAN Interworking," Journal of Information & Computational Science 9: 7 (2012), pp. 1991-2000.
International Search Report and Written Opinion Issued in corresponding international application No. PCT/EP2014/078752, dated May 4, 2015, 10 pages.
"3rd Generation Partnership Project; Technical Specification Group Services and System Aspects; General Packet Radio (GPRS); Service description; Stage 2 (Release 12)", 3GPP TS 23.060 V12. 3.0 (Dec. 2013), 344 pages.
"3rd Generation Partnership Project; Technical Specification Group Core Network and Terminals; Mobile Application Part (MAP) specification (Release 12)" 3GPP TS 29.002 V12.3.0 (Dec. 2013), 1018 pages.

* cited by examiner

METHOD AND NODES FOR AUTHORIZING NETWORK ACCESS

CROSS-REFERENCE TO RELATED APPLICATIONS

This application is a 35 U.S.C. §371 National Phase Entry Application from PCT/EP2014/078752, filed Dec. 19, 2014, and designating the United States, which claims priority to U.S. Provisional Application No. 61/955,476, filed Mar. 19, 2014. The above-identified applications are incorporated by reference in their entirety.

TECHNICAL FIELD

Embodiments herein relate generally to an Authentication, Authorization and Accounting (AAA) server, a method in the AAA server, a Home Location Register (HLR) and a method in the HLR. More particularly the embodiments herein relate to enabling authorization of a wireless device to access a first network while simultaneously accessing a second network which the wireless device is currently accessing.

BACKGROUND

Wi-Fi, which is a technology which enables wireless devices to exchange data or connect to the internet wirelessly using radio waves, is considered a key candidate for small cell solutions for mobile broadband heterogeneous networks. Wi-Fi is mainly specified by Institute of Electrical and Electronics Engineers (IEEE) in the 802.11 family of specifications and updated by for example the Wi-Fi Alliance (WFA). There are currently intense activities in all corners of the world on how to integrate Wi-Fi with Third Generation Partnership Project (3GPP) networks and offer a "carrier Wi-Fi" solution where, in a similar fashion as any 3GPP radio access technology, Wi-Fi is integrated with the 3GPP Evolved Packet Core (EPC) and where access selection and traffic steering between 3GPP Radio Access Technologies (RATs) and Wi-Fi may be controlled through the network. Standardization and certification organizations like 3GPP, WFA, Global System for Mobile communications Association (GSMA) and Wireless Broadband Alliance (WBA) are producing material on carrier-integrated Wi-Fi and network equipment manufacturers are making products where Wi-Fi is integrated on different levels.

Current solutions for network integrated Wi-Fi offers a way to seamlessly access Wi-Fi and EPC, authenticating Wi-Fi use through Extensible Authentication Protocol-Subscriber Identity Module (EAP-SIM) or Extensible Authentication Protocol-Authentication and Key Agreement (EAP-AKA) methods towards the same network entities as are used for 3GPP (e.g. HLR). With EAP-SIM and EAP-AKA, there is no need for users of wireless devices to manually enter credentials to access Wi-Fi, but instead, the authentication is done in a similar way as when a cellular network is accessed.

In the radio network, solutions are currently being developed for network controlled selection of what access a wireless device and its user should select to get best service from the network. Such network controlled access selection comprises that wireless devices may perform authentication by using an EAP-SIM/AKA/AKA' procedure. EAP-AKA' is a variant of the EAP-AKA.

When performing authentication of Wi-Fi usage, there may also be a wish to authorize a user, and to be able to manage users based on what type of use and service a certain user is authorized to get. One example is that the usage of Wi-Fi is dependent on the subscription the end user has bought and that Wi-Fi is not included in every type of subscription. This may be done via communication to a database, where such authorization data is stored.

One current solution is to use the HLR as the main database for authorization information of users in Wi-Fi and through AAA-HLR communication to see to that authorization is managed and performed. Using HLR, there is no need to create any second database for authorization related information and subscribers in an operator network already have all their information available through HLR.

It is not until one considers wireless devices that have the capability of being simultaneously attached and in communication with multiple RATs that the problem with using HLR as a database for authorization becomes clear.

The overall requirements related to "dual connectivity" between 3GPP and Wi-Fi has also been documented both in the 3GPP and the GSMA. Examples are as following:

3GPP SA1 TS 22.234, V11.0.0 (For I-WLAN from 3GPP Rel-6→, section 5.1.7.2)
"For an integrated WLAN/3GPP device the user shall be able to connect to both the PS domain and to the I-WLAN at the same time, to access different services.")

3GPP SA2 TS 23.234, V11.0.0 (For 1-WLAN from 3GPP Rel-6→, section 5.1.2)
"The WLAN connection established for a 3GPP subscriber shall have no impact to the capabilities of having simultaneous PS and CS connections for the same subscriber. (e.g. the HLRSS shall not deregister a PS subscriber when the UE registers on a WLAN)")

GSMA, Official Document TS.22, V2.0 ("Recommendations for Minimal Wi-Fi Capabilities of Terminals"), section 4.7
Maintaining network operator services across varying network technologies provides better network performance through offloading. However, disruption of services should be kept at a minimum when switching between different network technologies e.g. switching from 3G to WLAN.
It is important that the mobile network connection be kept when WLAN access has been performed for the following reasons:
For core network capacity (i.e. no new PDP context establishment on 3GPP on every AP connection).
Charging tickets processing load)
Transparent user interface This problem has also been acknowledged by other network providers.

The abbreviations CS, PS, WLAN, I-WLAN, UE, 3G, PDP and AP used above are short for Circuit Switched (CS), Packet Switched (PS), Wireless Local Area Network (WLAN), Interworking-Wireless LAN (I-WLAN), User Equipment (UE), Third Generation (3G), Packet Data Protocol (PDP) and Access Point (AP).

SUMMARY

An objective of embodiments herein is therefore to obviate at least one of the above disadvantages and to provide improved handling of access to a first network for a wireless device.

According to a first aspect, the objective is achieved by a method performed by an AAA server for enabling authorization of a wireless device to access a first network while simultaneously accessing a second network which the wireless device is currently accessing. The AAA server determines that the wireless device requests access to the first network. The AAA server transmits, to a HLR, information associated with the first network. The AAA server receives, from the HLR, network profile data associated with the wireless device. Based on the received information, the AAA server authorizes the wireless device to access the first network.

According to a second aspect, the objective is achieved by a method in performed by a HLR for enabling authorization of a wireless device to access a first network while simultaneously accessing a second network which the wireless device is currently accessing. The HLR receives, from an AAA server, information associated with the first network which the wireless device has requested to access. Based on the received information, the HLR obtains network profile data associated with the wireless device. The HLR transmits, to the AAA server, the obtained network profile data.

According to a third aspect, the objective is achieved by an AAA server for enabling authorization of a wireless device to access a first network while simultaneously accessing a second network which the wireless device is currently accessing. The AAA server is configured to determine that the wireless device requests access to the first network. The AAA server is configured to transmit, to a HLR, information associated with the first network. The AAA server is configured to receive, from the HLR, network profile data associated with the wireless device. The AAA server is configured to, based on the received information, authorize the wireless device to access the first network.

According to a fourth aspect, the objective is achieved by a HLR for enabling authorization of a wireless device to access a first network while simultaneously accessing a second network which the wireless device is currently accessing. The HLR is configured to receive, from an AAA server, information associated with the first network which the wireless device has requested to access. The HLR is configured to, based on the received information, obtain network profile data associated with the wireless device. The HLR is configured to transmit, to the AAA server, the obtained network profile data.

Since the AAA server uses the information associated with the first network and the network profile data associated with the wireless device to authorize the wireless device to access the first network, the handling of access to a first network for a wireless device is improved.

Embodiments herein afford many advantages, of which a non-exhaustive list of examples follows:

An advantage of the embodiments herein is that they allow usage of the HLR as an authorization database also for wireless devices that are targeting access/authentication to use of first network while at the same time accessing a second network. This may be solved at the same time as dual connectivity support is not jeopardized.

A further advantage of the embodiments herein is that the HLR may maintain a profile for e.g. Wi-Fi usage for a subscriber, e.g. location.

Another advantage of the embodiments herein is that the HLR does not need to send any CANCEL_LOCATION message to the registered WCDMA SGSN.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1A:
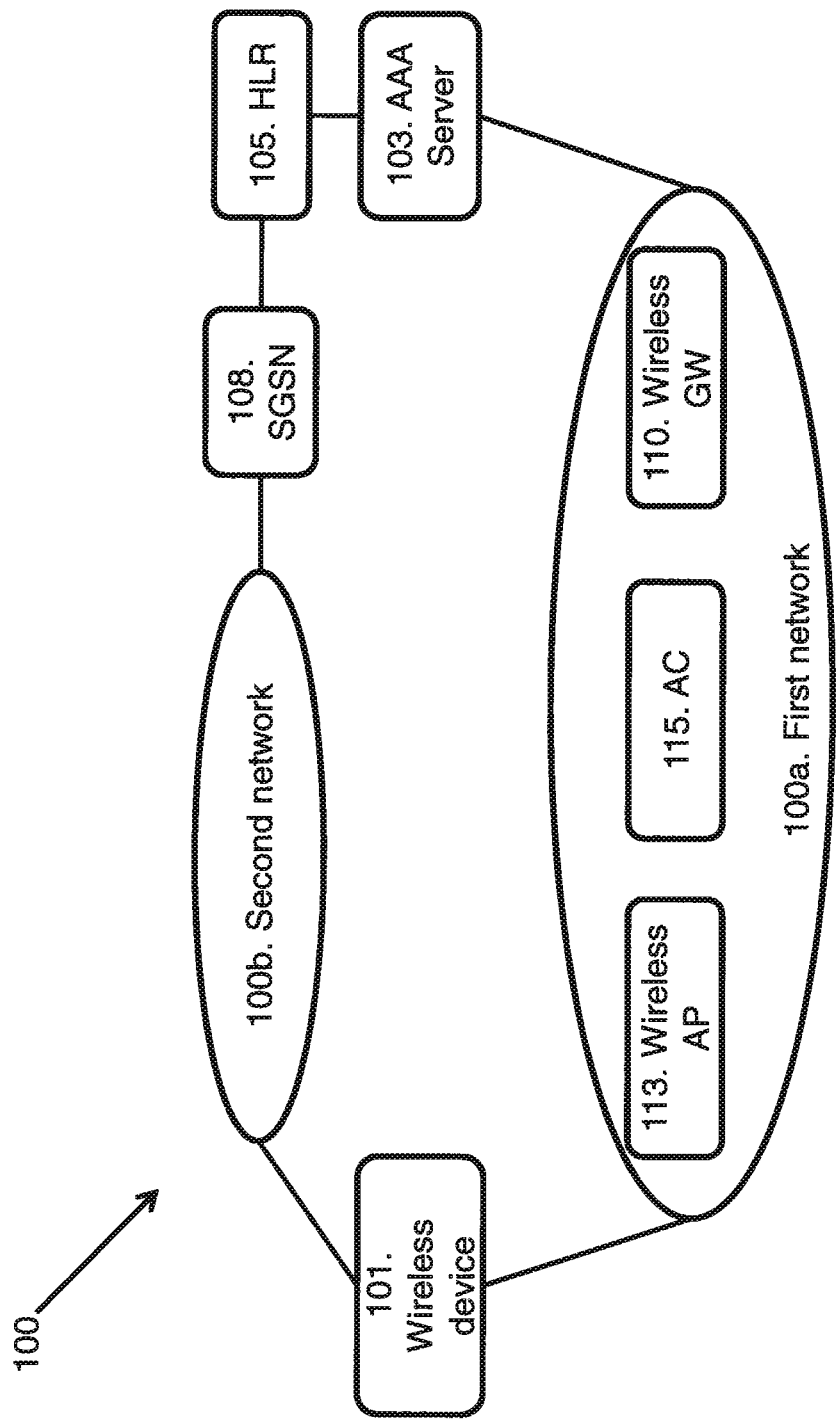
FIG. 1a is a schematic block diagram illustrating embodiments of a communications system.

FIG. 1a depicts an embodiment of a communications system 100 in which embodiments herein may be implemented. The communications system may be seen as a combination of radio access networks and one or more core networks, depending on network configuration.

The communications system 100 comprises a first network 100a and a second network 100b. The first and second networks 100a, 100b may be seen as radio access networks. The first network 100a and the second network 100b may apply different access technologies. The first network 100a may be a wireless network such as e.g. a Wi-Fi network, and the second network 100b may be a 3GPP network, such as e.g. a WCDMA network or a GSM network.

A wireless device 101 may access at least one of the first network 100a and the second network 100b. The wireless device 101 may be a device by which a subscriber may access services offered by a cellular/mobile operator's network and services outside cellular/mobile operator's network to which the cellular/mobile operators radio access network and core network provide access, e.g. access to the Internet. The wireless device 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The wireless device 101 may be portable, pocket storable, hand held, computer comprised, or vehicle mounted devices, enabled to communicate voice and/or data, via the radio access network, with another entity, such as another device or a server.

The first network 100a may comprise at least one first network node, such as a wireless Access Point (wireless AP) 113, an Access Controller (AC) 115 and a wireless GateWay (wireless GW) 118. The wireless AP 113 may allow the wireless device 101 to connect to e.g. a wired network such as e.g. the Internet, or other wireless devices using Wi-Fi or other related wireless standards. The AC 115 is a first network node which may handle access control, usage monitoring and policy enforcement in the first network 100a. The wireless GW 110 may be responsible for routing packets between e.g. the first network 100a and the Internet. The wireless GW 110 may also be connected to the cellular/mobile operator's core network. The AC 115 and the wireless GW 110 may be separate entities or they may be one entity, i.e. the AC 115 and wireless GW 110 may be co-located in one entity. The first network 100a may comprise additional first network nodes in addition to the ones exemplified in FIG. 1a. Some of these additional first network nodes may be seen in FIG. 1b, which will be described in more detail below.

The second network 100b comprises at least one second network node (not shown in FIG. 1a). Some of these second network nodes are seen in FIG. 1b, which will be described in more detail below.

The communications system 100 in FIG. 1a further comprises a Serving GPRS Support Node (SGSN) 108, a HLR 105 and an AAA server 103. GPRS is short for general packet radio service. The SGSN 108 may be described as being responsible for delivery of packets to and from the wireless device 101 within the service area of the SGSN 108. The HLR 105 may be described as a database comprising information associated with subscribers that are authorized to access the second network 100b and also the first network 100a, e.g. a subscriber database. The HLR 105 may comprise information associated with Subscriber Identity Module (SIM) cards issued by the wireless device operator. Such information may be e.g. International mobile Subscriber Identity (IMSI), Mobile Station International Subscriber Directory Number (MSISDN) etc. The AAA server 103 may be a node which handles which users are allowed access to which services (by performing both authentication and authorization of the users) and tracking the services that they have used (by performing both accounting of the users). AAA may for instance be related to at least one of protocols: the Mobile Application Part (MAP) protocol, the Remote Authentication Dial In User Service (RADIUS) protocol and the Diameter protocol.

Figure 1B:
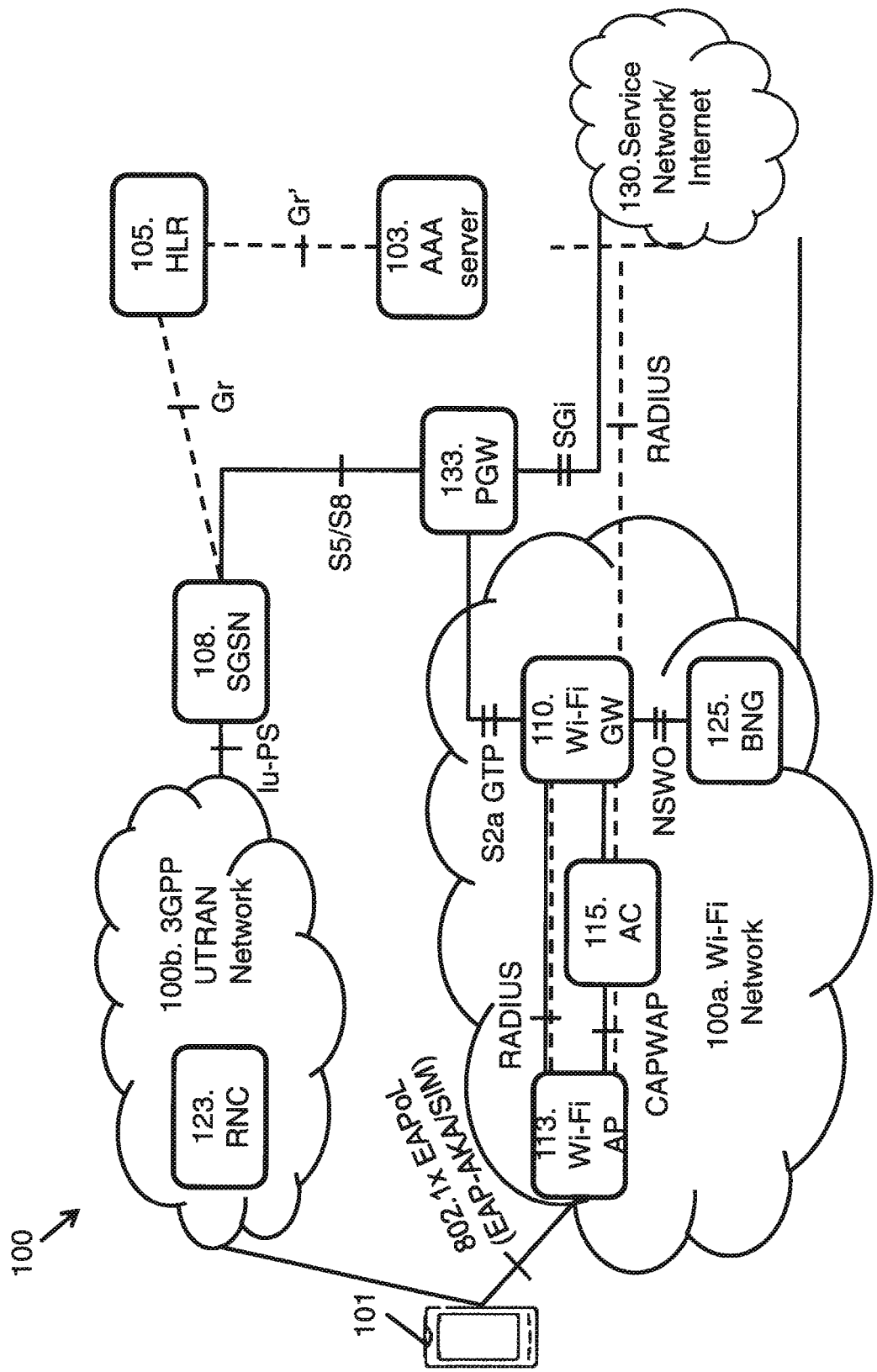
FIG. 1b is a schematic block diagram illustrating embodiments of a communications system.

FIG. 1b depicts an embodiment of the communications system 100 in which embodiments herein may be implemented. FIG. 1b illustrates additional nodes in the system 100 compared to FIG. 1a. The solid lines between the entities in FIG. 1b illustrate the control plane and the user plane. The dotted lines between the entities in FIG. 1b illustrate only the control plane (i.e. signaling).

In FIG. 1b, the first network 100a is exemplified by a Wi-Fi network and the second network 100b is exemplified by a 3GPP Universal Terrestrial Radio Access Network (UTRAN) network. Note that the second network 100b is not limited to a 3GPP network and that it may also be e.g. a Wi-Fi network.

As also seen in FIG. 1a, the communications system 100 illustrated in FIG. 1b comprises a wireless device 101. In FIG. 1b, the wireless device 101 may be served by a Radio Access Network (RAN) node such as a Radio Network Controller (RNC) 123 in the 3GPP network 100b, i.e. the RNC 123 is an example of a second network node. It should be understood that the RNC 123 may be connected to a number of base stations that communicate with the wireless device 101.

In the embodiment of the communications system 100 illustrated in FIG. 1b, the wireless AP 113 is represented by a Wi-Fi AP and the wireless GW 110 may be represented by a Wi-Fi GW.

The wireless device 101 may be connected to the Wi-Fi AP 113 using e.g. 802.1x Extensible Authentication Protocol (EAP) over LAN (EAPoL) (e.g. EAP-AKA/SIM). The Wi-Fi AP 113 may be connected to the AC 115 via a Control And Provisioning of Wireless Access Points (CAPWAP) protocol interface. The Wi-Fi GW 110 may be connected to the Wi-Fi AP 113 for example using an interface based on the RADIUS protocol.

The Wi-Fi GW 110 may be connected to a Broadband Network Gateway (BNG) 125. The connection between the Wi-Fi GW 110 and the BNG 115 may be based on Non-Seamless Wi-Fi Offload (NSWO), also called Local Breakout (LBO). The BNG 125 may be seen as a gateway to the service network/Internet 130.

The Wi-Fi GW 110 may be connected to a Packet data network GateWay (PGW) 133. The connection between the Wi-Fi GW 110 and the PGW 133 may be based on S2a GTP. GTP is short for GPRS Tunneling Protocol. The PGW 133 may be connected to the service network/Internet 130 e.g. via a SGi interface.

The PGW 133 may be connected to a SGSN 108, for example via a Gn (S5/S8) interface. The SGSN 108 may also be connected to the PGW 133 via the SGW (not shown in FIG. 1b), and in this case the interface between the SGSN 108 and the SGW is S4, and the interface between the SGW and the PGW 133 is S5/S8. The SGSN 108 may be connected to the 3GPP UTRAN network 100b via e.g. the Iu-PS interface.

The SGSN 108 may be connected to the HLR 105 for example via a Gr interface.

The HLR 105 may be connected to the AAA server 103 for example via at least one of a Gr' interface and a Gc interface. The AAA server 103 may be connected to the Wi-Fi GW 110 using a connection based on e.g. the RADIUS protocol.

The SGSN 108, the PGW 133 and the SGSN 108 may be seen as being part of a Core Network (CN).

It should be noted that the links between the nodes in the communications system 100 may be of any suitable kind including either a wired or wireless link. The links may use any suitable protocol depending on type and level of layer (e.g. as indicated by the Open Systems Interconnection (OSI) model) as understood by the person skilled in the art.

Figure 2:
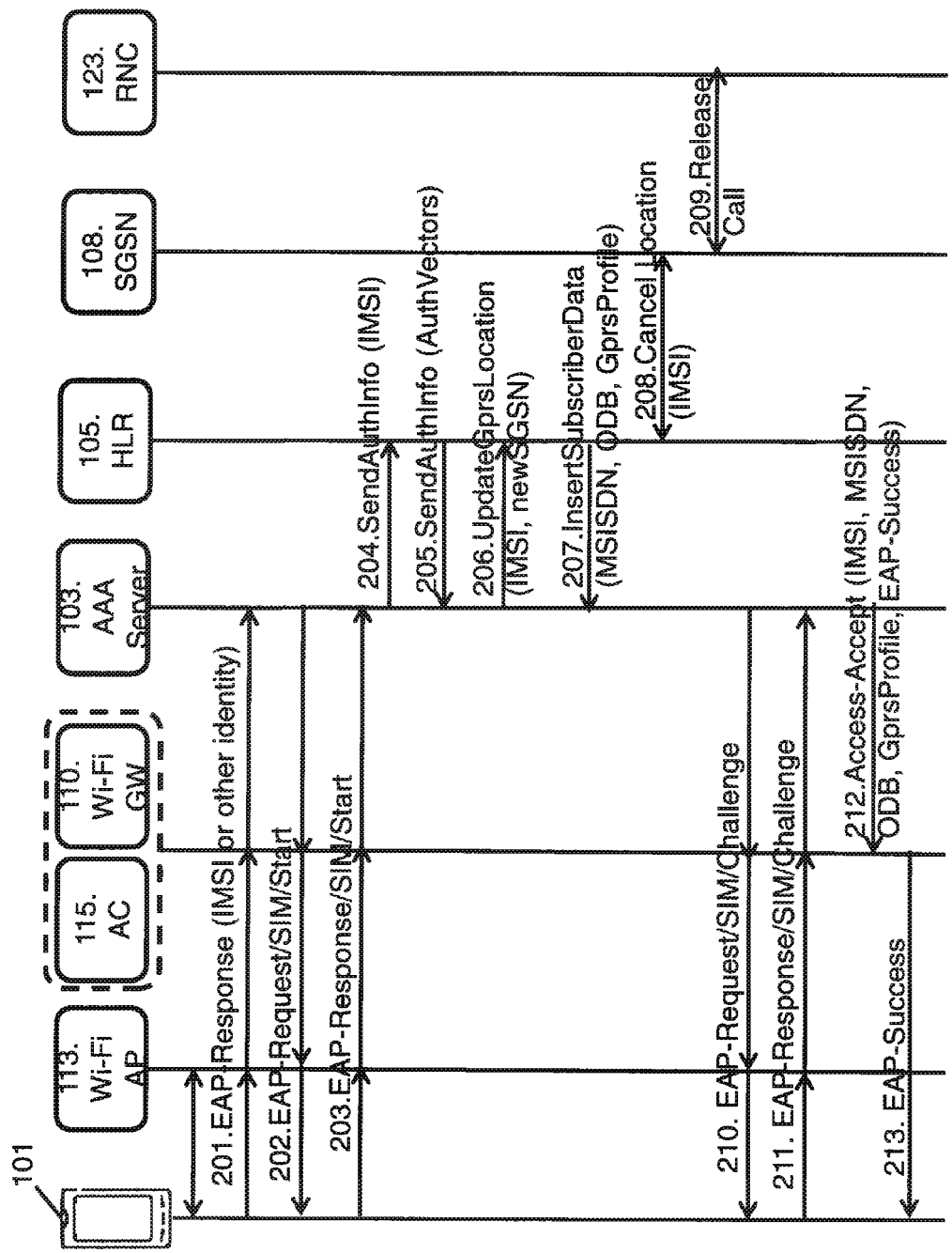
FIG. 2 is a signaling diagram illustrating embodiments of a method.

A problem using the HLR 105 as a database for authorization purposes relates to the standardized MAP signaling sequences (See e.g. 3GPP TS 29.002 V12.3.0) for retrieving subscriber data. Such signaling sequence is illustrated in FIG. 2. FIG. 2 is based on the embodiment of the communications system 100 illustrated in FIG. 1b, but is equally applicable to the communications system 100 illustrated in FIG. 1a. The dotted box around the AC 115 and the Wi-Fi GW 110 illustrates that these entities may be co-located in one entity.

Before step 201, initial steps may take place between the wireless device 101 and the Wi-Fi AP 113 (depicted via the arrow before step 201 in FIG. 2). These steps may comprise for example beacon or probe request/probe response, open system authentication request/open system authentication response, association request/association response and identity request. The identity request is sent from the Wi-Fi AP 113 to the wireless device 101 and may be an EAP-Request/Identity message.

The method illustrated in FIG. 2 comprises at least some of the following steps, which steps may be performed in any suitable order than described below:

Step 201

The wireless device 101 may transmit an access response message to the AAA server 103. The access response message may be an s EAP-Response message as seen in FIG. 2. This message may be conveyed from the wireless device 101 through at least one of the Wi-Fi AP 113, the AC 115 and the Wi-Fi GW 110 on its way to the AAA server 103, indicated with three arrows in FIG. 2. The access response message is a response to the request for access to the first network 100*a* (e.g. the Wi-Fi network)

The access response message may comprise information identifying the wireless device 101, e.g. an IMSI or any other suitable parameter identifying the wireless device 101. The access response message may also indicate that the wireless device 101 supports EAP-SIM authentication.

FIG. 2 does not show all the details for example in signaling between the wireless device 101 and the Wi-Fi AP 113. For example, the access request message can be triggered by the Wi-Fi AP 113 based on other signaling received from the wireless device 101. In addition, the EAP-SIM signaling between the wireless device 101 and the AAA server 113 may be carried in EAPoL messages between the wireless device 101 and the Wi-Fi AP 113, and in RADIUS messages between the Wi-Fi AP 113 and the AAA server 113. In some embodiments, the AAA server 103 may be co-located with a Mobile Application Part GateWay (MAP GW) functionality (not shown in FIG. 2) that performs the needed actions to convert between the authentication signaling towards the wireless device 101 and the MAP protocol signaling towards the HLR 105.

Step 202

The AAA server 103 may send a request message to the wireless device 101. This request message may be an EAP-Request message. The EAP-Request message may be of the SIM type and of subtype Start. This request message may be conveyed from the AAA server 103, through at least one of the Wi-Fi GW 110, the AC 115 and the Wi-Fi AP 113 on its way to the wireless device 101, indicated with three arrows in FIG. 2.

The EAP-Request/SIM/Start message may comprise an EAP-SIM parameter. In this case the EAP-SIM parameter indicates that an EAP-SIM procedure has been initiated. The EAP-SIM parameter may also include a list of supported EAP-SIM versions.

Step 203

The wireless device 101 may send a response message to the AAA server 103. The response message may be an EAP-Response message of the SIM type and of subtype Start. The response message in step 203 may be a response to the request message in step 202. This response message may be conveyed from the wireless device 101, through at least one of the Wi-Fi AP 113, the AC 115 and the Wi-Fi GW 110 on its way to the AAA server 103, indicated with three arrows in FIG. 2.

The EAP-Response/SIM/Start message may comprise an EAP-SIM parameter indicating a randomly selected number as well as the selected EAP-SIM version.

Step 204

The AAA server 103 may send a request message comprising a request for authentication information to the HLR 105. The request message may be a SendAuthInfo request message (for example as defined in 3GPP TS 29.002 V12.3.0 in section 8.5.2 as MAP_SEND_AUTHENTICATION_INFO). The request message may comprise information identifying the wireless device 101, such as the IMSI or any other suitable parameter identifying the wireless device 101.

Step 205

The HLR 105 may send a response message back to the AAA server 103, i.e. a response to the request message in step 204. The response may be a SendAuthInfo response message. The response message may comprise information identifying authentication vectors.

Step 206

The AAA server 103 may send a message comprising updated GPRS location information to the HLR 105. The request may be an UpdateGPRSLocation message (for example as defined in 3GPP TS 29.002 V12.3.0 in section 8.1.7 as MAP_UPDATE_GPRS_LOCATION). Such updated GPRS location may be at least one of information identifying the wireless device 101, e.g. IMSI, and information identifying a new SGSN 108.

Step 207

The HLR 105 may send a message comprising subscription information associated with the wireless device 101 to the new SGSN 108 indicated in the UpdateGPRSLocation message. Such message may be e.g. an InsertSubscriberData message (for example as defined in 3GPP TS 29.002 V12.3.0 in section 8.8.1 as MAP_INSERT_SUBSCRIBER_DATA). The message may comprise at least one of a MSISDN, Operator Determined Barring (ODB) and GprsProfile.

Step 208

The HLR 105 sends, to the current SGSN 108 serving the wireless device 101, information indicating cancelling of the connection to the current SGSN 108. The current SGSN 108 can also be seen as an old SGSN 108 for the HLR 105 i.e. it is the SGSN 108 the HLR 105 had stored information about before the HLR 105 received the UpdateGPRSLocation message in step 206.

Step 209

The SGSN 108 and the RNC 123 releases the connection, e.g. a data session, between them.

Step 210

The AAA server 103 sends a request message to the wireless device 101. The request message may be an EAP-request message of type SIM and of subtype challenge. The request message may sent via at least some of the Wi-Fi GW 110, the AC 115 and the Wi-Fi AP 113 on its way to the wireless device 101, indicated with the three arrows in FIG. 2.

Step 211

The wireless device 101 sends a response message to the AAA server 103. The response message is a response to the request message in step 210. The response message may be an EAP-response message of type SIM and of subtype Challenge. The response message may be sent via at least one of the Wi-Fi AP 113, the AC 115 and the Wi-Fi GW 110 on its way to the AAA server 103, indicated with three arrows in FIG. 2.

Step 212

The AAA server 103 sends an Access-Accept message to at least one of the Wi-Fi GW 110 and the AC 115 or to the co-located Wi-Fi GW 110 and AC 115. The Access-Accept message may comprise at least one of an IMSI, MSISDN, ODB, GprsProfile and EAP-success indicator. The accept message indicates that the request for access in step 201 has been accepted.

Step 213

At least one of the Wi-Fi GW 110 and the AC 115 or the co-located Wi-Fi GW 110 and the AC 115 sends an EAP success message to the wireless device 101.

Steps 210, 211, 212 and 213 in FIG. 2 are according to an existing EAP-SIM signaling procedure to finalize the EAP-SIM signaling and to indicate the success of the EAP-SIM signaling to the Wi-Fi AP.

When subscriber data is going to be retrieved from the HLR 105, the AAA server 103 would need to "mimic" or act as an SGSN 108. The information needed, (e.g., Access Point Names (APNs), and other wireless device related information) from the HLR 105 would be sent in a message InsertSubscriberData (see e.g. 3GPP TS 29.002 v12.3.0 section 8.8.1 MAP_INSERT_SUBSCRIBER_DATA) that is generally sent from the HLR 105 to the SGSN 108, and triggering this message may currently only be done through a location update procedure (i.e. to inform the HLR 105 that a wireless device 101 has moved to another SGSN 108). There is no real need to do it otherwise, as any serving SGSN 108 in the 3GPP UTRAN network 100b would have the information already, (unless the location of the wireless device 101 is updated). Thus, the AAA server 103 need to send the message UpdateGPRSLocation (IMSI, New SGSN, etc.—defined in 3GPP TS 29.002 v12.3.0 section 8.1.7 MAP_UPDATE_GPRS_LOCATION) to be able to retrieve the information needed to authorize users on the first network side 100s, e.g. the Wi-Fi side.

The HLR 105, when sending the information to the AAA server 103, would then also trigger a CancelLocation procedure (3GPP TS 29.002 v12.3.0 section 8.1.3 MAP_CANCEL_LOCATION) towards the old SGSN 108, as from the HLR 105 perspective, the location of the wireless device 101 is now updated. This, in turn would cause the SGSN 108 to release the voice call or the PS session on the 3GPP UTRAN network 100b side towards the RNC 123 and towards the wireless device 101 (step 209 in FIG. 2). This is further described for example in 3GPP TS 23.060 v12.3.0, section 6.9.1.2.2 "Inter-SGSN Routing Area Update".

Given that wireless devices 101 are capable of simultaneous connection to multiple networks, e.g., through Multiple-Access PDN CONnecfivity (MAPCON), MultiPath Transmission Control Protocol (MPTCP), Internet Protocol Flow Mobility (IFOM) support, this is not a desired behavior. In many instances, communication towards one network should be kept, even though communication towards another network is initiated.

A method for enabling authorization of a wireless device 101 to access a first network 100a when it is a wireless network, e.g. a Wi-Fi network, according to some embodiments will now be described with reference to the signaling diagram depicted in FIG. 3. Initially, the wireless device 101 has been authorized access to the second network 100b.

The method in FIG. 3 comprises at least some of the following steps, which steps may as well be carried out in another suitable order than described below:

Step 301

The wireless device 101 has previously requested and been granted access to the second network 100b. The second network 100b may apply a second Radio Access Technology (RAT) type. The second RAT type may be e.g. Wi-Fi or 3GPP (e.g. 2G, 3G, 4G or 5G).

Step 302

The wireless device 101 may request access to the first network 100a by sending a request message to the AAA server 103. The first network 100a may apply a first RAT type. The first RAT type may be e.g. Wi-Fi or 3GPP (e.g. 2G, 3G, 4G, or 5G). The first network 100a may be a network where authorization information associated with the second network 100b is comprised in the HLR 105.

The wireless device 101 may send the request message to request access to the first network 100a at any time after it has accessed the second network 100b. The wireless device 101 may send the request message via a number of other nodes such as e.g. the Wireless AP 113, the AC 115 and the Wireless GW 110.

The following table 1 comprises examples of combinations of RAT types applied by the two networks 100a, 100b. The left column comprises the examples of the first RAT type applied by the first network 100a and the right column comprises examples of the second RAT type which may be applied by the second network 100b:

TABLE 1

| First network 100a | Second network 100b |
|---|---|
| Wi-Fi | Wi-Fi |
| Wi-Fi | 2G |
| Wi-Fi | 3G |
| Wi-Fi | 4G |
| Wi-Fi | 5G |

The table above illustrates only examples of the combinations of RAT types. However, any other types than the ones exemplified above and in any combination is also applicable. Furthermore, even though FIGS. 1a, 1b and 3 illustrate two networks, i.e. the first network 100a and the second network 100b, the embodiments herein are equally applicable to any other number of networks.

Step 303

The AAA server 103 may determine that the wireless device 101 requests access to the first network 100a. This may involve determining that the wireless device 101 request access to a network which applies a radio access technology which is different than the one it already accesses, e.g. the RAT applied by the first network 100a is different form the RAT applied by the second network 100b.

Step 304

The AAA server 103 may send information associated with the first network 100a to the HLR 105. This sent information may be at least one of the following:

- A parameter indicating the RAT type of the first network 100a (e.g. new RAT type parameter or Wi-Fi RAT Type parameter).
- A parameter indicating that it is the AAA server 103 that sends the information. The parameter may be referred to as e.g. AAA flag".
- A message comprising a request for a first network profile data for the radio access technology of the first network 100a.

Each of the three alternatives above will be described in more detail below with reference to FIGS. 4, 5 and 6.

Step 305

When the HLR 105 has received the information in step 304, the HLR 105 may obtain a network profile data associated with the wireless device 101. The network profile data may be associated with the wireless device 101 either in the first network 100a or the second network 100b, i.e. either for the first RAT or the second RAT. The HLR 105 may obtain it by creating new profile data or by updating existing profile data. Thus, the HLR 105 has a dual registration of radio access technologies associated with the wireless device 101 which may be e.g. Wi-Fi and 3G.

The first network profile data may also be referred to as a first network profile information or first network profile. The first network profile data may comprise information associated with the radio access technology of the first network 100a, e.g. the first RAT. The information may comprise for example an indicator of that the first RAT is allowed, that the first RAT is not allowed, whether or not S2a or a local breakout is to be activated, whether or not a specific RAT is allowed such as e.g. Wi-Fi (identified for example by Service Set IDentifier (SSID) or any other Wi-Fi related identifier etc.) etc. SSID is a parameter that differentiates one WLAN from another.

The first network profile data may define e.g. the APN, PDN parameters etc. for the first network 100a. The first network profile data may further comprise information indicating whether the wireless device 101 is allowed (or not allowed) the first network access via S2a/S2b GTP Tunnel or LBO etc. First network integration information may be differentiated by APNs as well. The first network profile data may be used to authorize access to the first network 100a.

Previously, i.e. when the wireless device 101 requested access to the second network 100b, the HLR 105 has obtained a second network profile data for the second RAT type.

So, once the HLR 105 has received the information associated with the access to the first network 100a, it is possible to differentiate it from the existing network profiles stored in the HLR 105. The first network profile data may be used for authorizing the access to the first network 100a, and it may also be used to defining specific APNs and/or PDNs for the access to the first network 100a.

The HLR 105 may now have two sets of network profile data, i.e. a first network profile data and a second network profile data. Both these network profile data may be changed without impacting the one that is not changed. Any such change or update may be notified towards the AAA server 103 if necessary, e.g. define/change the APN for Wi-Fi subscribers (see step 306).

Step 306

The HLR 105 may transmit the network profile data to the AAA server 103, i.e. either the first network profile data or the second network profile data or both.

Any update or change of subscriber related data associated with the first RAT type may be transmitted from the HLR 105 to the AAA server 103 for example by means of the InsertSubscriberData message.

Step 307

Based on the received network profile data, the AAA server 103 may authorize the wireless device 101 to access the first network 100a.

Step 308

The AAA server 103 may transmit information indicating the authorization to access the first network 100a to the wireless device 101. This information may be sent via a number of other nodes such as e.g. the wireless GW 110, the AC 115, the wireless AP 113 etc.

Step 309

The wireless device 101 accesses the first network 100a as it has requested in step 302.

The embodiments herein also apply in the case when the wireless device 101 first connects to Wi-Fi (i.e. the second network 100b is a Wi-Fi network) and later on to a 2G or 3G network (i.e. the first network 100a is a 2G or 3G network). Even in this case, the HLR 103 may transmit the new indications to not trigger any "cancel location" towards the AAA-server 103.

A method for enabling authorization of a wireless device 101 to access a wireless network, e.g. a Wi-Fi network, according to some embodiments will now be described with reference to the signaling diagram depicted in FIG. 4. In FIG. 4, first network 100a is represented by a Wi-Fi network and the second network 100b is represented by a 3GPP network. The nodes are the ones as exemplified in FIG. 1b. Initially, the wireless device 101 has been authorized access to the second network 100b. When the UPDATE_G-PRS_LOCATION message is sent from the AAA server 103 to the HLR 105 to retrieve the GprsProfile, the AAA server 103 will include a specific indication towards the HLR 105. With this indication, the HLR 105 does not consider the AAA server 103 to be new SGSN. As a result, the HLR 105 will not send any CANCEL_LOCATION message to the current WCDMA SGSN 108 as the AAA indication will be treated by the HLR 105 as a node for new RAT type access.

Figure 4:
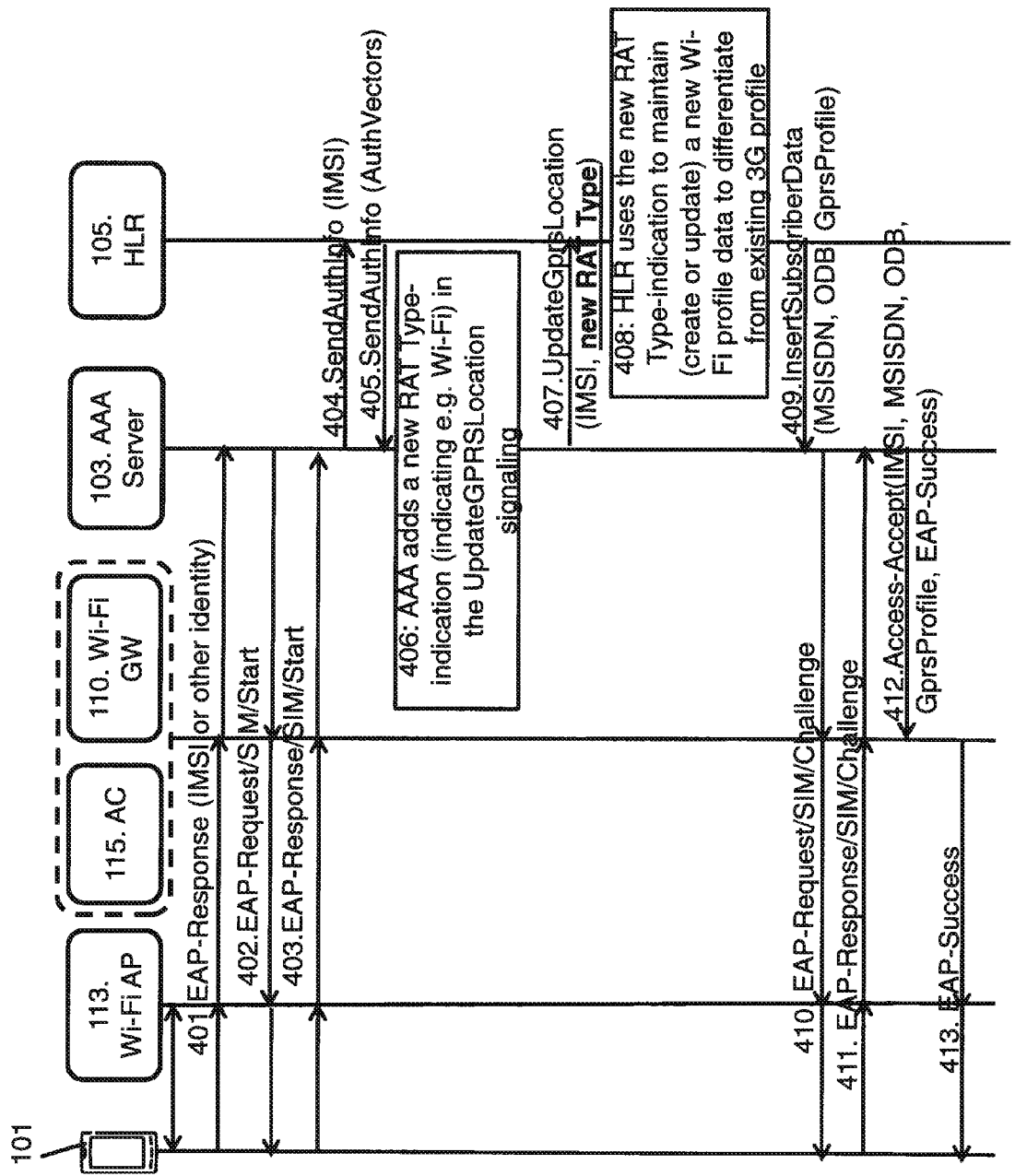
FIG. 4 is a signaling diagram illustrating embodiments of a method.

Before step 401, initial steps may take place between the wireless device 101 and the Wi-Fi AP 113 (depicted via the arrow before step 401 in FIG. 4). These steps may comprise for example beacon or probe request/probe response, open system authentication request/open system authentication response, association request/association response and identity request. The identity request is sent from the Wi-Fi AP 113 to the wireless device 101 and may be an EAP-Request/Identity message.

The method in FIG. 4 comprises at least some of the following steps, which steps may as well be carried out in another suitable order than described below:

Step 401

This step corresponds to step 201 in FIG. 2. The wireless device 101 may transmit an access request message to the AAA server 103 (shown as EAP-Response in FIG. 4). This message may be conveyed from the wireless device 101, through at least one of the Wi-Fi AP 113, the AC 115 and the Wi-Fi GW 110 on its way to the AAA server 103, indicated with three arrows in FIG. 4.

The access request message may comprise information identifying the wireless device 101, e.g. an IMSI or any other suitable parameter identifying the wireless device 101. The access request message may also indicate that the wireless device 101 supports EAP-SIM authentication.

FIG. 4 does not show all the details in for example signaling between the wireless device 101 and the Wi-Fi AP 113. For example, the access request message can be triggered by the Wi-Fi AP 113 based on other signaling received from the wireless device 101. In addition, the EAP-SIM signaling between the wireless device 101 and the AAA server 113 may be carried in EAPoL messages between the wireless device 101 and the Wi-Fi AP 113, and in RADIUS messages between the Wi-Fi AP 113 and the AAA server 113. In some embodiments, the AAA server 103 may be co-located with a MAP GW functionality (not shown in FIG. 4) that performs the needed actions to convert between the authentication signaling towards the wireless device 101 and the MAP protocol signaling towards the HLR 105.

Step 402

This step corresponds to step 202 in FIG. 2. The AAA server 103 may send an EAP-Request/SIM/Start message to the wireless device 101. This message may be conveyed from the AAA server 103, through at least one of the Wi-Fi GW 110, the AC 115 and the Wi-Fi AP 113 on its way to the wireless device 101, indicated with three arrows in FIG. 4.

The EAP-Request/SIM/Start message may comprise an EAP-SIM parameter. In this case the EAP-SIM parameter indicates that an EAP-SIM procedure has been initiated. It also includes a list of supported EAP-SIM versions.

Step 403

This step corresponds to step 203 in FIG. 2. The wireless device 101 may send an EAP-Response/SIM/Start message to the AAA server 103. This message may be conveyed from the wireless device 101, through at least one of the Wi-Fi AP 113, the AC 115 and the Wi-Fi GW 110 on its way to the AAA server 103, indicated with three arrows in FIG. 4.

The EAP-Response/SIM/Start message may comprise an EAP-SIM parameter indicating a randomly selected number as well as the selected EAP-SIM version.

Step 404

This step corresponds to step 204 in FIG. 2. The AAA server 103 may send a request for authentication information to the HLR 105. The request may be a SendAuthInfo message (for example as defined in 3GPP TS 29.002 V12.3.0 in section 8.5.2 as MAP_SEND_AUTHENTICATION_INFO). The request may comprise information identifying the wireless device 101, such as the IMSI or any other suitable parameter identifying the wireless device 101.

Step 405

This step corresponds to step 205 in FIG. 2. The HLR 105 may send a response back to the AAA server 103, i.e. a response to the request in step 404. The response may be a SendAuthInfo message. The response message may comprise information identifying authentication vectors.

Step 406

Figure 3:
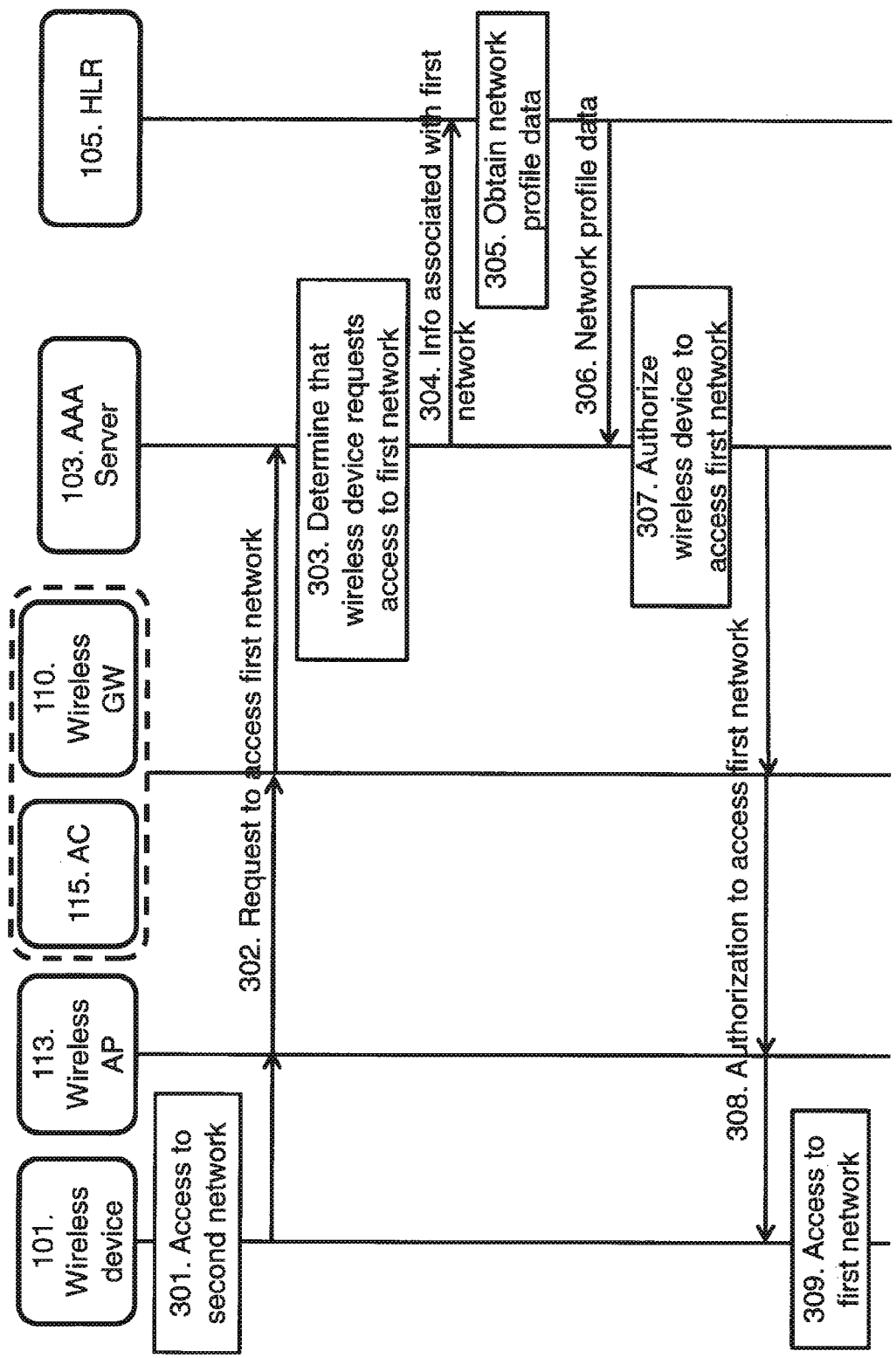
FIG. 3 is a signaling diagram illustrating embodiments of a method.

This step corresponds to step 303 in FIG. 3. The AAA server 103 adds a new RAT Type-indication (the indication indicates that the new RAT type is e.g. Wi-Fi) in the UpdateGPRSLocation signaling. The indication may also be referred to as a parameter. The UpdateGPRSLocation signaling may be e.g. a MAP_UPDATE_GPRS_LOCATION message as defined in 3GPP TS 29.002 which may be seen as a transaction-based procedure between the AAA server 103 and the HLR 105.

The new RAT Type-indication indicates that the wireless device 101 request access to a new RAT type, i.e. a RAT type which it has not previously been authorized access to. The new RAT type may also be seen as a non-existing RAT type.

Step 407

This step corresponds to step 304 in FIG. 3. The AAA server 103 may send the new RAT Type-indication to the HLR 105. The AAA server 103 may send the IMSI associated with the wireless device 101 together with the new RAT Type-indication.

Step 408

This step corresponds to step 305 in FIG. 3. Upon reception of the indication in step 407, the HLR 105 may manage the message as being received from a Wi-Fi network. No MAP_CANCEL_LOCATION to the registered WCDMA SGSN will be sent by the HLR 105. Additionally, a Wi-Fi profile may be created implicitly or it may be pre-provisioned for the subscriber (e.g. IMSI based) so that any further subscriber update impacting the Wi-Fi profile will be notified via a MAP_INSERT_SUBSCRIBER_DATA message for example in the same way as performed for CS and PS changes towards e.g. the Visitors Location Register (VLR) and SGSN. In other words, the HLR 105 may use the new RAT Type-indication to maintain (create or update) a new Wi-Fi profile data to differentiate it from the existing 3G profile.

Step 409

This step corresponds to step 306 in FIG. 3. The HLR 105 may send the created Wi-Fi profile to the AAA server 103. The Wi-Fi profile may be sent in e.g. an InsertSubscriberData message together with e.g. MSISDN, ODB etc. The InsertSubscriberData message may be e.g. a MAP_INSERT_SUBSCRIBER_DATA message as defined in 3GPP TS 29.002, V12.4.0 which may be seen as a response to the MAP_UPDATE_GPRS_LOCATION message in a transaction-based procedure between the AAA server 103 and the HLR 105.

Instead of the Wi-Fi profile being comprised in the parameter GprsProfile, the Wi-Fi profile may be comprised in a separate parameter, referred to as e.g. a Wi-Fi Profile parameter, in the message. In such scenario the Wi-FiProfile parameter may be sent instead of the GprsProfile or in addition to the GprsProfile.

Step 410

This step corresponds to step 210 in FIG. 2. The AAA server 103 may transmit an EAP Request/SIM/Challenge message to the wireless device 101. This message may be sent via at least one of the Wi-Fi GW 110, the AC 115 and the Wi-Fi AP 113.

Step 411

This step corresponds to step 211 in FIG. 2. The wireless device 101 may transmit an EAP-Response/SIM/Challenge message to the AAA server 103. This message may be sent via at least one of the Wi-Fi GW 110, the AC 115 and the Wi-Fi AP 113.

Step 412

This step corresponds to step 212 in FIG. 2. The AAA server 103 sends an Access-Accept message to at least one of the Wi-Fi GW 110 and the AC 115. The Access-Accept message indicates that access to the first network 100a has been accepted. The Access-Accept message may comprise at least one of the IMSI, MSISDN, ODB, GprsProfile (i.e. the Wi-Fi profile created in step 408), EAP-Success etc.

Step 413

This step corresponds to step 213 in FIG. 2. The Wi-Fi GW 110 or the AC 115 sends an EAP-Success message to the wireless device 101.

Steps 410, 411, 412 and 413 in FIG. 4 are according to existing EAP-SIM signaling procedure to finalize the EAP-SIM signaling and to indicate the success of the EAP-SIM signaling to the Wi-Fi AP.

A method for enabling authorization of a wireless device 101 to access a wireless network, e.g. a Wi-Fi network, according to some embodiments will now be described with reference to the signaling diagram depicted in FIG. 5. In FIG. 5, first network 100a is represented by a Wi-Fi network and the second network 100b is represented by a 3GPP network. The nodes are the ones as exemplified in FIG. 1b. When the UpdateGprsLocation message, e.g. a MAP_UPDATE_GPRS_LOCATION message, is sent from the AAA server 103 to the HLR 105 to retrieve the GprsProfile, the AAA server 103 may include a specific indication into the Extension Container argument towards the HLR 105 to prevent that the AAA server 103 is being considered as a new SGSN 108. The HLR 105 will not send any MAP_CANCEL_LOCATION to the current WCDMA SGSN 108 as the AAA indication may be treated by the HLR 105 as a node for new RAT-type access.

The Extension Container argument mentioned above may be used in 3GPP MAP messages for including proprietary information. If the node receiving the message has not implemented the logic for un-decoding data included in that argument, it simply discards it.

Figure 5:
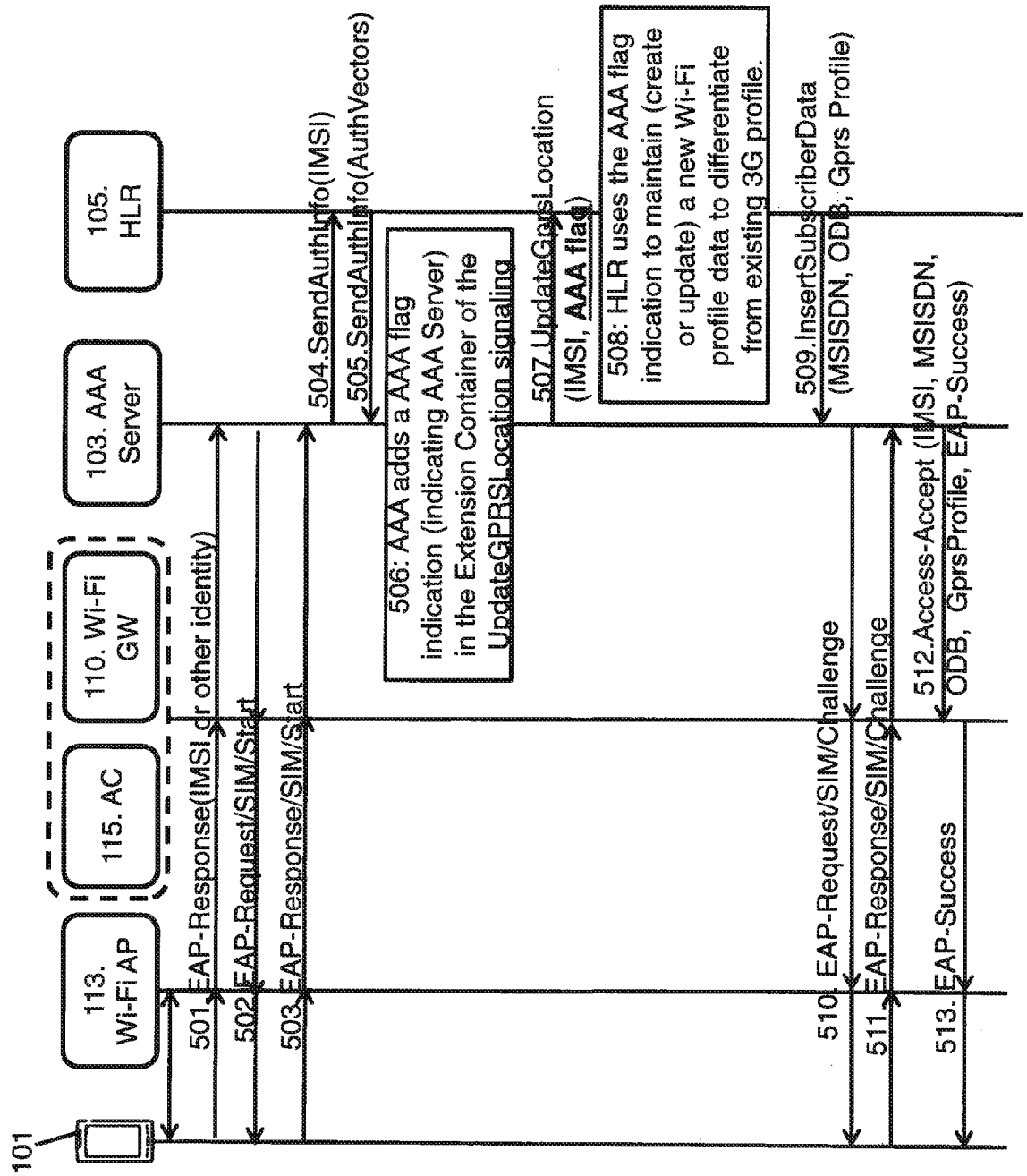
FIG. 5 is a signaling diagram illustrating embodiments of a method.

Before step 501, initial steps may take place between the wireless device 101 and the Wi-Fi AP 113 (depicted via the arrow before step 501 in FIG. 5). These steps may comprise for example beacon or probe request/probe response, open system authentication request/open system authentication response, association request/association response and identity request. The identity request is sent from the Wi-Fi AP 113 to the wireless device 101 and may be an EAP-Request/Identity message.

The method in FIG. 5 comprises at least some of the following steps, which steps may as well be carried out in another suitable order than described below:

Step 501

This step corresponds to step 201 in FIG. 2 and step 401 in FIG. 4. The wireless device 101 may transmit an access request message to the MA server 103 (shown as EAP-Response in FIG. 5). This message may be conveyed from the wireless device 101, through at least one of the Wi-Fi AP 113, the AC 115 and the Wi-Fi GW 110 on its way to the MA server 103, indicated with three arrows in FIG. 5.

The access request message may comprise information identifying the wireless device 101, e.g. an IMSI or any other suitable parameter identifying the wireless device 101. The access request message also indicates that the wireless device 101 supports EAP-SIM authentication.

FIG. 5 does not show all the details for example in signaling between the wireless device 101 and the Wi-Fi AP 113. For example, the access request message can be triggered by the Wi-Fi AP 113 based on other signaling received from the wireless device 101. In addition, the EAP-SIM signaling between the wireless device 101 and the AAA server 113 may be carried in EAPoL messages between the wireless device 101 and the Wi-Fi AP 113, and in RADIUS messages between the Wi-Fi AP 113 and the AAA server 113. In some embodiments, the MA server 103 may be co-located with a MAP GW functionality (not shown) that performs the needed actions to convert between the authentication signaling towards the wireless device 101 and the MAP protocol signaling towards the HLR 105.

Step 502

This step corresponds to step 202 in FIG. 2 and step 402 in FIG. 4. The AAA server 103 may send an EAP-Request/SIM/Start message to the wireless device 101. This message may be conveyed from the AAA server 103, through at least one of the Wi-Fi GW 110, the AC 115 and the Wi-Fi AP 113 on its way to the wireless device 101, indicated with three arrows in FIG. 5.

The EAP-Request/SIM/Start message may comprise an EAP-SIM parameter In this case the EAP-SIM parameter indicates that an EAP-SIM procedure has been initiated. It also includes a list of supported EAP-SIM versions.

Step 503

This step corresponds to step 203 in FIG. 2 and step 403 in FIG. 4. The wireless device 101 may send an EAP-Response/SIM/Start message to the AAA server 103. This message may be conveyed from the wireless device 101, through at least one of the Wi-Fi AP 113, the AC 115 and the Wi-Fi GW 110 on its way to the MA server 103, indicated with three arrows in FIG. 5.

The EAP-Response/SIM/Start message may comprise an EAP-SIM parameter indicating a randomly selected number as well as the selected EAP-SIM version.

Step 504

This step corresponds to step 204 in FIG. 2 and step 404 in FIG. 4. The AAA server 103 may send a request for authentication information to the HLR 105. The request may be a SendAuthInfo message (for example as defined in 3GPP TS 29.002 V12.3.0 in section 8.5.2 as MAP_SEND_AUTHENTICATION_INFO). The request may comprise information identifying the wireless device 101, such as the IMSI or any other suitable parameter identifying the wireless device 101.

Step 505

This step corresponds to step 205 in FIG. 2 and step 405 in FIG. 4. The HLR 105 may send a response back to the AAA server 103, i.e. a response to the request in step 504. The response may be referred to as a SendAuthInfo message. The response message may comprise information identifying authentication vectors.

Step 506

This step corresponds to step 303 in FIG. 3. The AAA server 103 may add an MA flag-indication (the indication indicates the AAA Server 103) in the Extension Container of the UpdateGPRSLocation signaling. The UpdateGPRSLocation signaling may be e.g. a MAP_UPDATE_GPRS_LOCATION message as defined in 3GPP TS 29.002 V12.4.0 which may be seen as a transaction-based procedure between the AAA server 103 and the HLR 105.

Step 507

This step corresponds to step 304 in FIG. 3. The AAA server 103 transmits the indication (e.g. referred to as AAA flag) in the Extension Container argument of the of the UpdateGPRSLocation message to the HLR 105.

The AAA flag may indicate that it is the AAA server 103 that sends the indication. The identity of the AAA server 103 may also be sent together with the indication.

The AAA flag may be seen as an indicator which indicates that the sender of the UpdateGPRS Location message comes from the MA server (instead of coming from an SGSN 108).

The identity of the AAA server 103 may also be included in other information elements in any of the messages sent by the AAA server 103.

Step 508

This step corresponds to step 305 in FIG. 3. Upon reception of new indication, the HLR 105 may manage the message received in step 507 as being received from a Wi-Fi network. No MAP_CANCEL_LOCATION to the registered WCDMA SGSN 108 will be sent by the HLR 105. Additionally, a Wi-Fi profile may be created implicitly for the subscriber (e.g. IMSI based) so that any further subscriber update impacting it may be notified via e.g. a MAP_INSERT_SUBSCRIBER_DATA message for example in the same way as performed for CS and PS changes towards VLR and SGSN. The HLR 103 uses the AAA flag-indication to maintain (create or update) a new Wi-Fi profile data to differentiate from the existing 3G profile.

Step 509

This step corresponds to step 306 in FIG. 3. The HLR 105 sends the Wi-Fi profile from step 508 to the AAA server 103. The HLR 105 may send the Wi-Fi profile in an InsertSubscriberData message such as e.g. MAP_INSERT_SUBSCRIBER_DATA message as defined in 3GPP TS 29.002 V12.4.0 which may be seen as a response to the MAP_UPDATE_GPRS_LOCATION message in a transaction-based procedure between the AAA server 103 and the HLR 105. The Wi-Fi profile may be included in the parameter GprsProfile in the InsertSubscriberData message. In addition to the Wi-Fi profile, parameters such as e.g. MSISDN, ODB, etc. may be sent to the AAA server 103.

Instead of the Wi-Fi profile being comprised in the parameter GprsProfile, the Wi-Fi profile may be comprised in a separate parameter, e.g. a Wi-FiProfile parameter in the message. In such scenario the Wi-FiProfile parameter may be sent instead of the GprsProfile or in addition to the GprsProfile.

Step 510

This step corresponds to step 210 in FIG. 2 and step 410 in FIG. 4. The AAA server 103 may transmit an EAP Request/SIM/Challenge message to the wireless device 101. This message may be sent via at least one of the Wi-Fi GW 110, the AC 115 and the Wi-Fi AP 113.

Step 511

This step corresponds to step 211 in FIG. 2 and step 411 in FIG. 4. The wireless device 101 may transmit an EAP-Response/SIM/Challenge to the AAA server 103. This message may be sent via at least one of the Wi-Fi GW 110, the AC 115 and the Wi-Fi AP 113.

Step 512

This step corresponds to step 212 in FIG. 2 and step 512 in FIG. 5. The AAA server 103 sends an Access-Accept message to at least one of the Wi-Fi GW 110 and the AC 115. The Access-Accept message indicates that access to the first network 100a has been accepted. The Access-Accept message may comprise at least one of the following parameters: IMSI, MSISDN, ODB, GprsProfile (i.e. the Wi-Fi profile created in step 408), EAP-Success etc.

Step 513

This step corresponds to step 213 in FIG. 2 and step 413 in FIG. 4. The Wi-Fi GW 110 or the AC 115 sends an EAP-Success message to the wireless device 101.

Steps 510, 511, 512 and 513 in FIG. 5 are according to existing EAP-SIM signaling procedure to finalize the EAP-SIM signaling and to indicate the success of the EAP-SIM signaling to the Wi-Fi AP 113.

A method for enabling authorization of a wireless device 101 to access a wireless network, e.g. a Wi-Fi network, according to some embodiments will now be described with reference to the signaling diagram depicted in FIG. 6. In FIG. 6, first network 100a is represented by a Wi-Fi network and the second network 100b is represented by a 3GPP network. The nodes are the ones as exemplified in FIG. 1b. In FIG. 6, a new signaling message is sent between the MA server 103 and the HLR 105. The HLR 105 will not send any MAP_CANCEL_LOCATION to the current WCDMA SGSN 108 as the AAA server 103 will be treated by the HLR 105 as a node for the new RAT-type access.

Figure 6:
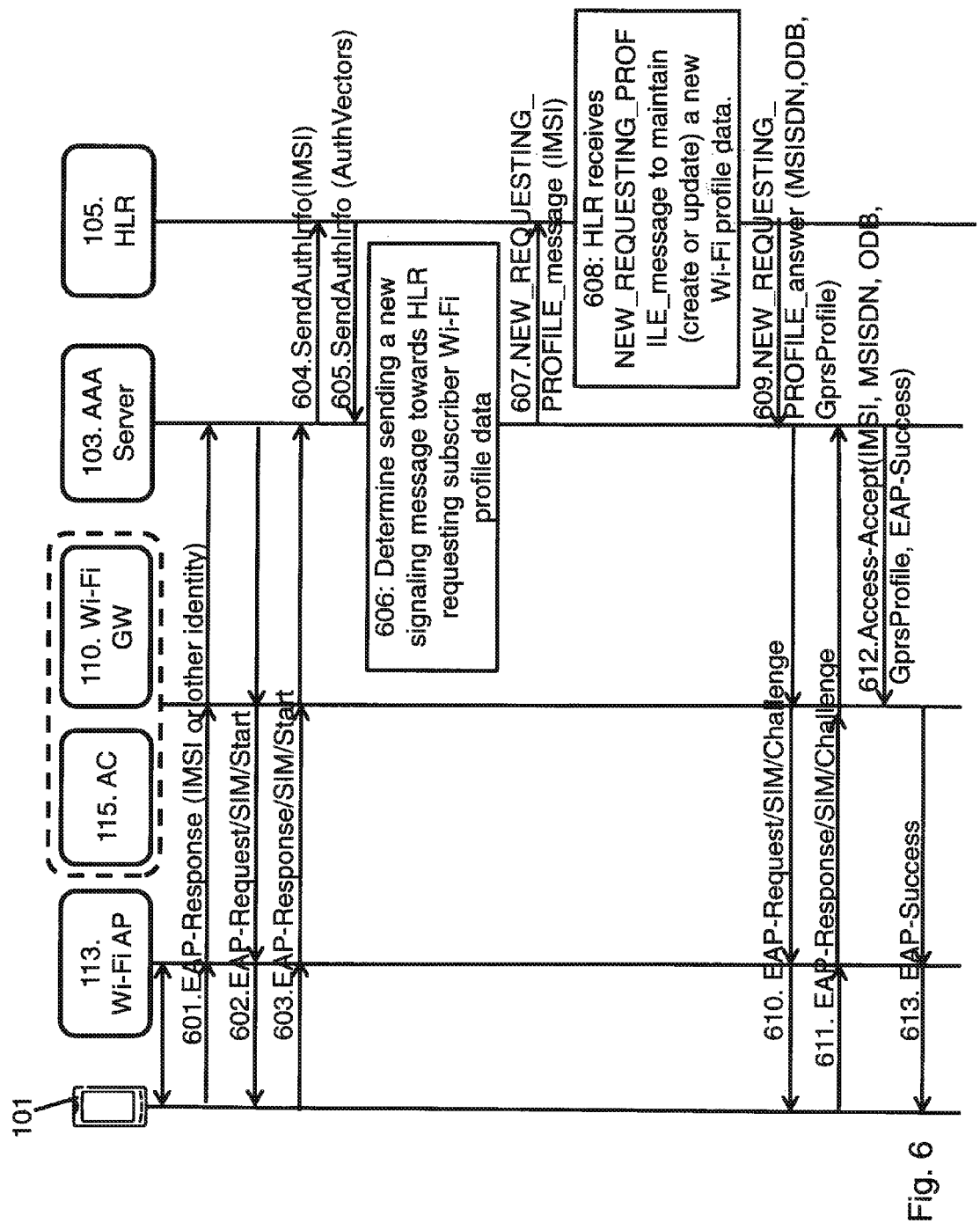
FIG. 6 is a signaling diagram illustrating embodiments of a method.

Before step 601, initial steps may take place between the wireless device 101 and the Wi-Fi AP 113 (depicted via the arrow before step 601 in FIG. 6). These steps may comprise for example beacon or probe request/probe response, open system authentication request/open system authentication response, association request/association response and identity request. The identity request is sent from the Wi-Fi AP 113 to the wireless device 101 and may be an EAP-Request/Identity message.

The method in FIG. 6 comprises at least some of the following steps, which steps may as well be carried out in another suitable order than described below:

Step 601

This step corresponds to step 201 in FIG. 2 and step 401 in FIG. 4 and step 501 in FIG. 5. The wireless device 101 may transmit an access request message to the AAA server 103 (shown as EAP-Response in FIG. 6). This message may be conveyed from the wireless device 101, through at least one of the Wi-Fi AP 113, the AC 115 and the Wi-Fi GW 110 on its way to the AAA server 103, indicated with three arrows in FIG. 6.

The access request message may comprise information identifying the wireless device 101, e.g. an IMSI or any other suitable parameter identifying the wireless device 101. The access request message also indicates that the wireless device 101 supports EAP-SIM authentication.

FIG. 6 does not show all the details for example in signaling between the wireless device 101 and the Wi-Fi AP 113. For example, the access request message can be triggered by the Wi-Fi AP 113 based on other signaling received from the wireless device 101. In addition, the EAP-SIM signaling between the wireless device 101 and the AAA server 113 may be carried in EAPoL messages between the wireless device 101 and the Wi-Fi AP 113, and in RADIUS messages between the Wi-Fi AP 113 and the AAA server 113. In some embodiments, the AAA server 103 may be co-located with a MAP GW functionality (not shown in FIG. 6) that performs the needed actions to convert between the authentication signaling towards the wireless device 101 and the MAP protocol signaling towards the HLR 105.

Step 602

This step corresponds to step 202 in FIG. 2 and step 402 in FIG. 4 and step 502 in FIG. 5. The AAA server 103 may send an EAP-Request/SIM/Start message to the wireless device 101. This message may be conveyed from the AAA server 103, through at least one of the Wi-Fi GW 110, the AC 115 and the Wi-Fi AP 113 on its way to the wireless device 101, indicated with three arrows in FIG. 6.

The EAP-Request/SIM/Start message may comprise an EAP-SIM parameter. In this case, the EAP-SIM parameter indicates that an EAP-SIM procedure has been initiated. The message also includes a list of supported EAP-SIM versions.

Step 603

This step corresponds to step 203 in FIG. 2 and step 403 in FIG. 4 and step 503 in FIG. 5. The wireless device 101 may send an EAP-Response/SIM/Start message to the AAA server 103. This message may be conveyed from the wireless device 101, through at least one of the Wi-Fi AP 113, the AC 115 and the Wi-Fi GW 110 on its way to the AAA server 103, indicated with three arrows in FIG. 6.

The EAP-Response/SIM/Start message may comprise an EAP-SIM parameter indicating a randomly selected number as well as the selected EAP-SIM version.

Step 604

This step corresponds to step 204 in FIG. 2 and step 404 in FIG. 4 and step 504 in FIG. 5. The AAA server 103 may send a request for authentication information to the HLR 105. The request may be a SendAuthInfo message (for example as defined in 3GPP TS 29.002 V12.3.0 in section 8.5.2 as MAP_SEND_AUTHENTICATION_INFO). The request may comprise information identifying the wireless device 101, such as the IMSI or any other suitable parameter identifying the wireless device 101.

Step 605

This step corresponds to step 205 in FIG. 2 and step 405 in FIG. 4 and step 505 in FIG. 5. The HLR 105 may send a response back to the AAA server 103, i.e. a response to the request in step 604. The response may be a SendAuthInfo message. The response message may comprise information identifying authentication vectors.

Step 606

This step corresponds to step 303 in FIG. 3. The AAA server 103 may determine that it should send a signaling message towards the HLR 105 requesting profile data for the first network 100a, e.g. subscriber Wi-Fi profile data.

Step 607

This step corresponds to step 304 in FIG. 3. The AAA server 103 may send the determined message to the HLR 105. The message may be e.g. a NEW_REQUESTING_

PROFILE_message. The message may comprise as a minimum data subscriber IMSI associated with the wireless device 101.

Step 608

This step corresponds to step 305 in FIG. 3. Upon reception of the message in step 607, the HLR 105 may manage the message as associated with a new RAT-TYPE access (e.g. Wi-Fi). No MAP_CANCEL_LOCATION message will be sent to the registered WCDMA SGSN by the HLR 105. Additionally, a Wi-Fi profile may be maintained (e.g. created or updated) implicitly for the subscriber (e.g. IMSI based) so that any further subscriber update impacting it may be notified via e.g. a MAP_INSERT_SUBSCRIBER_DATA message in the same way as performed for e.g. CS and PS changes towards the VLR and the SGSN Step 609

This step corresponds to step 306 in FIG. 3. The HLR 105 may send an answer (e.g. a transaction-based procedure) to the message in step 607 (e.g. the NEW_REQUESTING_PROFILE message). The answer message comprises the created or updated Wi-Fi profile to the MA server 103. The Wi-Fi profile may be comprised in the parameter GprsProfile in the message. In addition to the Wi-Fi profile, the answer message may comprise e.g. the MSISDN, ODB, etc. Instead of the Wi-Fi profile being comprised in the parameter GprsProfile, the Wi-Fi profile may be comprised in a separate parameter, e.g. a Wi-Fi Profile parameter in the message. In such scenario the Wi-Fi Profile parameter may be sent instead of the GprsProfile or in addition to the GprsProfile.

Step 610

This step corresponds to step 210 in FIG. 2 and step 410 in FIG. 4 and step 510 in FIG. 5. The AAA server 103 may transmit an EAP Request/SIM/Challenge message to the wireless device 101. This message may be sent via at least one of the Wi-Fi GW 110, the AC 115 and the Wi-Fi AP 113.

Step 611

This step corresponds to step 211 in FIG. 2 and step 411 in FIG. 4 and step 511 in FIG. 5. The wireless device 101 may transmit an EAP-Response/SIM/Challenge message to the AAA server 103. This message may be sent via at least one of the Wi-Fi GW 110, the AC 115 and the Wi-Fi AP 113.

Step 612

This step corresponds to step 212 in FIG. 2, step 412 in FIG. 4 and step 512 in FIG. 5. The AAA server 103 sends an Access-Accept message to at least one of the Wi-Fi GW 110 and the AC 115. The Access-Accept message indicates that access to the first network 100a has been accepted. The Access-Accept message may comprise at least one of the parameters IMSI, MSISDN, ODB, GprsProfile (i.e. the Wi-Fi profile created in step 608), EAP-Success etc.

Step 613

This step corresponds to step 213 in FIG. 2 and step 413 in FIG. 4 and step 513 in FIG. 5. The Wi-Fi GW 110 or the AC 115 sends an EAP-Success message to the wireless device 101.

Steps 610, 611, 612 and 613 in FIG. 6 are according to existing EAP-SIM signaling procedure to finalize the EAP-SIM signaling and to indicate the success of the EAP-SIM signaling to the Wi-Fi AP 113.

Figure 7:
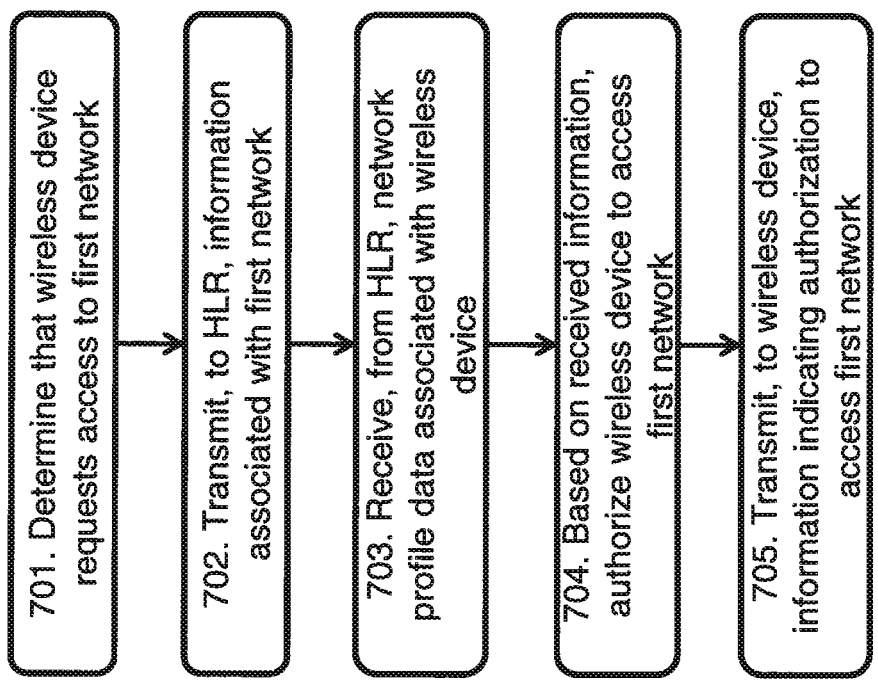
FIG. 7 is a flow chart illustrating embodiments of a method performed by an AAA server.

The method described above will now be described seen from the perspective of the AAA server 103. FIG. 7 is a flowchart describing the present method performed by the AAA server 103 for enabling authorization of a wireless device 101 to access a first network 100a while simultaneously accessing a second network 100b which the wireless device 101 is currently accessing. In some embodiments, the first network 100a is a wireless network and the second network 100b is a 3GPP network. In other embodiments, the first network 100a is a 3GPP network and the second network 100b is a wireless network. The method illustrated in FIG. 7 comprises at least some of the following steps to be performed by the AAA server 103:

Step 701

This step corresponds to step 303 in FIG. 3, step 406 in FIG. 4, step 506 in FIG. 5 and step 606 in FIG. 6. The AAA server 103 determines that the wireless device 101 requests access to the first network 100a.

In some embodiments, the AAA server 103 determines that the wireless device 101 requests access to the first network 100a by receipt 302 of an access request message from a wireless GW 110. The access request message may be sent from the wireless device 101, via at least one of the wireless AP 113, the AC 115 and the wireless GW 110 and to the AAA server 103.

Step 702

This step corresponds to step 304 in FIG. 3, step 407 in FIG. 4, step 507 in FIG. 5 and step 607 in FIG. 6. The AAA server 103 transmits, to a HLR 105, information associated with the first network 100a.

The first network 100a may be of a first radio access type and the second network 100b may be of a second radio access type.

The transmitted information associated with the first network 100a may be a parameter indicating a radio access type applied by the first network 100a. This referred to as a new RAT type parameter above.

The transmitted information associated with the first network 100a may indicate that the wireless device 101 requests access to the first network 100a which applies another radio access type compared to the radio access type applied by the second network 100b which the wireless device 101 is already accessing. In other words, the information associated with the first network 100a may be information indicating another radio access type which is different from the radio access type of the second network 100b which the wireless device 101 is already accessing.

The transmitted information associated with the first network 100a may indicate that the wireless device 101 is accessing a radio access type which it has not previously accessed. This information may also be referred to as the new RAT type parameter, and indicates that the wireless device 101 is accessing a radio access type which it has not previously accessed, i.e. the wireless device 101 has not previously accessed the first radio access type of the first network 100a. The new radio access type may be different compared to the current radio access type, i.e. the first radio access type may be different from the second radio access type. The new RAT type-parameter may also indicate what type the new radio access type is, e.g. Wi-Fi.

The transmitted information associated with the first network 100a may indicate a type of the node that sends the information associated with the first network 100a. The information associated with the first network 100a may e.g. indicate the AAA server. This may be the AAA flag parameter mentioned above. The AAA flag may indicate the type of the node that sends the information associated with the first network 100a, i.e. that the information is sent by an AAA server 103 (instead of e.g. a SGSN 108). The AAA flag parameter may comprise information indicating the identity of the AAA server 103.

The transmitted information associated with the first network 100a may be a request for first network profile data associated with the wireless device 101 in the first network

100a. The request may be a message which is dedicated for the request for the first network profile data. The information associated with the first network 100a may be transmitted in an existing message or a new message. This request message may be the NEW_REQUESTING_PROFILE_message mentioned above.

Step 703

This step corresponds to step 306 in FIG. 3, step 409 in FIG. 4, step 509 in FIG. 5 and step 609 in FIG. 6. The AAA server 103 receives, from the HLR 105, network profile data associated with the wireless device 101.

Step 704

This step corresponds to step 307 in FIG. 3. Based on the received information, the AAA server 103 authorizes the wireless device 101 to access the first network 100a.

Step 705

This step corresponds to step 308 in FIG. 3. In some embodiments, the AAA server 103 transmits, to the wireless device 101, information indicating the authorization to access the first network 100a.

Figure 8:
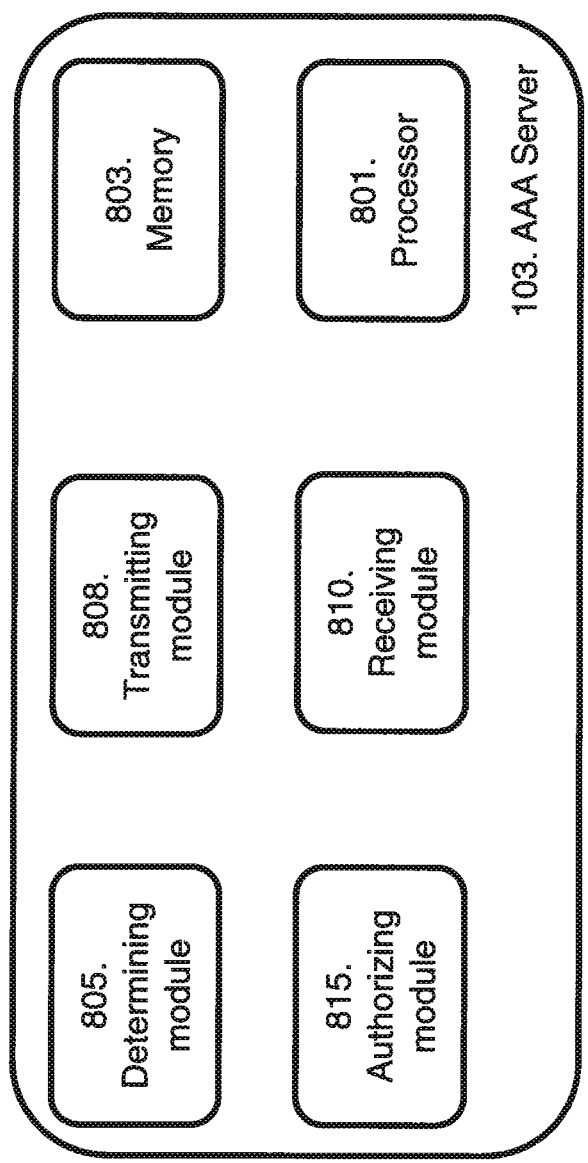
FIG. 8 is a schematic block diagram illustrating embodiments of an AAA server.

To perform the method steps shown in FIGS. 2-7 for enabling authorization of the wireless device 101 to access a first network 100a while simultaneously accessing a second network 100b the AAA server 103 may comprise an arrangement as shown in FIG. 8. The AAA server 103 may be adapted to perform any of the steps 303-308 in FIG. 3, any of the steps 401-407 and 409-412 in FIG. 4, any of the steps 501-507 and 509-512 in FIG. 5, any of the steps 601-607 and 609-612 in FIG. 6 and any of the steps 701-705 in FIG. 7. The MA server 103 may comprise a processor 801 which performs any of the above mentioned steps. The processor 801 may comprise a memory 803, and the memory 801 comprises instructions executable by the processor 01.

The AAA server 103 is adapted to, e.g. by means of a determining module 805, to determine that the wireless device 101 requests access to the first network 100a. The determining module 805 may also be referred to as a determining circuit, a determining unit, means to determine or determining means. The determining module 805 may be the processor 801 of the AAA server 103.

The AAA server 103 is adapted to, e.g. by means of a transmitting module 808, transmit, to a HLR 105, information associated with the first network 100a. In some embodiments, the transmitting module 808 is adapted to transmit the messages in e.g. steps 304 and 308 in FIG. 3 and the corresponding steps in FIGS. 4, 5 and 6. The transmitting module 808 may also be referred to as a transmitting circuit, a transmitting unit, means to transmit, transmitting means or output unit. The transmitting module 808 may be a transmitter or a transceiver etc. The transmitting module 808 may be a wireless transmitter of a wireless or fixed communications system. For instance, the transmitting module 808 may operate using TCP/IP protocol on Ethernet or optical physical access.

The AAA server 103 is adapted to, by means of a receiving module 810, receive, from the HLR 105, network profile data associated with the wireless device 101. Furthermore, the receiving module 810 may be adapted to receive e.g. the messages and information in steps 302 and 306 in FIG. 3 and the corresponding steps in FIGS. 4, 5 and 6. The receiving module 810 may also be referred to as a receiving circuit, a transmitting unit, means to receive, receiving means, output unit. The receiving module 810 may be a receiver or a transceiver etc. The receiving module 810 may be a wireless receiver of a wireless or fixed communications system. For instance, the receiving module 810 may operate using TCP/IP protocol on Ethernet or optical physical access.

The AAA server 103 is adapted to, by means of an authorizing module 815, based on the received information, authorize the wireless device 101 to access the first network 100a. The authorizing module 706 may being adapted to authorize the wireless device 101 to access the first network 100a in step 307 in FIG. 3. The authorizing module 815 may also be referred to as an authorizing circuit, an authorizing unit, means to authorize, authorizing means etc. The authorizing module 815 may be the processor 801 of the AAA server 103.

The memory 803 mentioned above may comprise one or more memory units. The memory 803 is arranged to be used to store data, received data streams, information associated with the first network 100a, IMSI, threshold values, time periods, configurations, schedulings, and applications to perform the methods herein when being executed in the AAA server 103.

Those skilled in the art will also appreciate that the transmitting module 808, the receiving module 810, the determining module 805 and the authorizing module 815 described above may refer to a combination of analog and digital circuits, and/or one or more processors configured with software and/or firmware, e.g. stored in a memory, that when executed by the one or more processors such as the processor 808 perform as described below.

A first computer program product or a computer program may be directly loadable into an internal memory of a digital computer within at least one entity of the AAA server 103 according to the above description and as seen in FIG. 8, wherein the first computer program product comprises software code portions for performing the method according to any one of the steps in at least one of the FIGS. 3-6 and 7 when said product is run on a computer.

A first computer program product or a computer program may be stored on a computer usable medium, wherein the first computer program product comprises a computer readable program for causing a computer, within an entity in the AAA server (103) according to the above description and as seen in FIG. 8, to control an execution of the method according to any one of the steps seen in at least one of the FIGS. 3-6 and 7.

Figure 9:
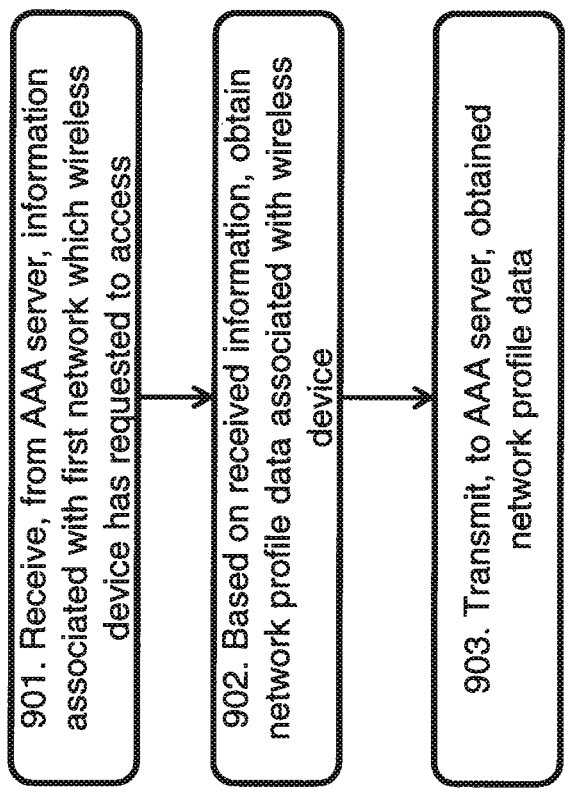
FIG. 9 is a flow chart illustrating embodiments of a method performed by a HLR.

The method described above will now be described seen from the perspective of the HLR 105. FIG. 9 is a flowchart describing the present method performed by the HLR 105 for enabling authorization of a wireless device 101 to access a first network 100a while simultaneously accessing a second network 100b which the wireless device 101 is currently accessing. In some embodiments, the first network 100a is a wireless network and the second network 100b is a 3GPP network. In other embodiments, the first network 100a is a 3GPP network and the second network 100b is a wireless network. The wireless network may be a Wi-Fi network. The first network 100a may be a network using authentication that is based on the IMSI. The 3GPP network may be a WCDMA network or a GSM network.

The method illustrated in FIG. 9 comprises at least some of the following steps to be performed by the HLR 105:

Step 901

This step corresponds to step 304 in FIG. 3, step 407 in FIG. 4, step 507 in FIG. 5 and step 607 in FIG. 6. The HLR 105 receives, from the AAA, server 103, information associated with the first network 100a which the wireless device 101 has requested to access.

The received information associated with the first network 100a may be a parameter indicating a radio access type applied by the first network 100a.

The received information associated with the first network 100a may indicates that the wireless device 101 requests access to the first network 100a which applies another radio access type compared to the radio access type applied by the second network 100b which the wireless device 101 is already accessing.

The received information associated with the first network 100a may indicate that the wireless device 101 is accessing a radio access type which it has not previously accessed.

The received information associated with the first network 100a may indicate a type of the node that sends the information associated with the first network 100a.

The received information associated with the first network 100a may comprise a request for first network profile data associated with the wireless device 101 in the first network 100a.

Step 902

This step corresponds to step 305 in FIG. 3, step 408 in FIG. 4, step 508 in FIG. 5 and step 608 in FIG. 6. Based on the received information, the HLR 105 obtains network profile data associated with the wireless device 101. The HLR 105 may obtain the network profile data by creating a network profile data or by updating an existing network profile data.

The network profile data may be at least one of a first network profile data associated with the wireless device 101 in the first network 100a and a second network profile data associated with the wireless device 101 in the second network 100b.

The HLR 105 may comprise a dual registration of the wireless device 101 when the HLR 105 comprises the first network profile data and the second network profile data. The first network profile data may be different from the second network profile data.

Both the first network 100a and the second network 100b may be updated at subscriber profile data changes associated either with the first network profile data or with the second network profile data when keeping dual registration in the HLR 105.

The first and second network 100a, 100b may apply different access technologies. The different access technologies may use HLR 105 as a central database. The HLR 105 may be a central database for a first radio access type applied by the first network 100a and a second radio access type applied by the second network 100b.

Step 903

This step corresponds to step 306 in FIG. 3, step 409 in FIG. 4, step 509 in FIG. 5 and step 609 in FIG. 6. The HLR 105 transmits, to the AAA server 103, the obtained network profile data.

In some embodiments, the HLR 105 only sends a CANCEL_LOCATION message to another node in the second network 100b when the HLR 105 has received an UpdateGPRSLocation message from the second network 100b. The HLR 105 may only send a CANCEL_LOCATION message to another node in the first network 100a when the HLR 105 has received an UpdateGPRSLocation message from the first network 100a.

Figure 10:
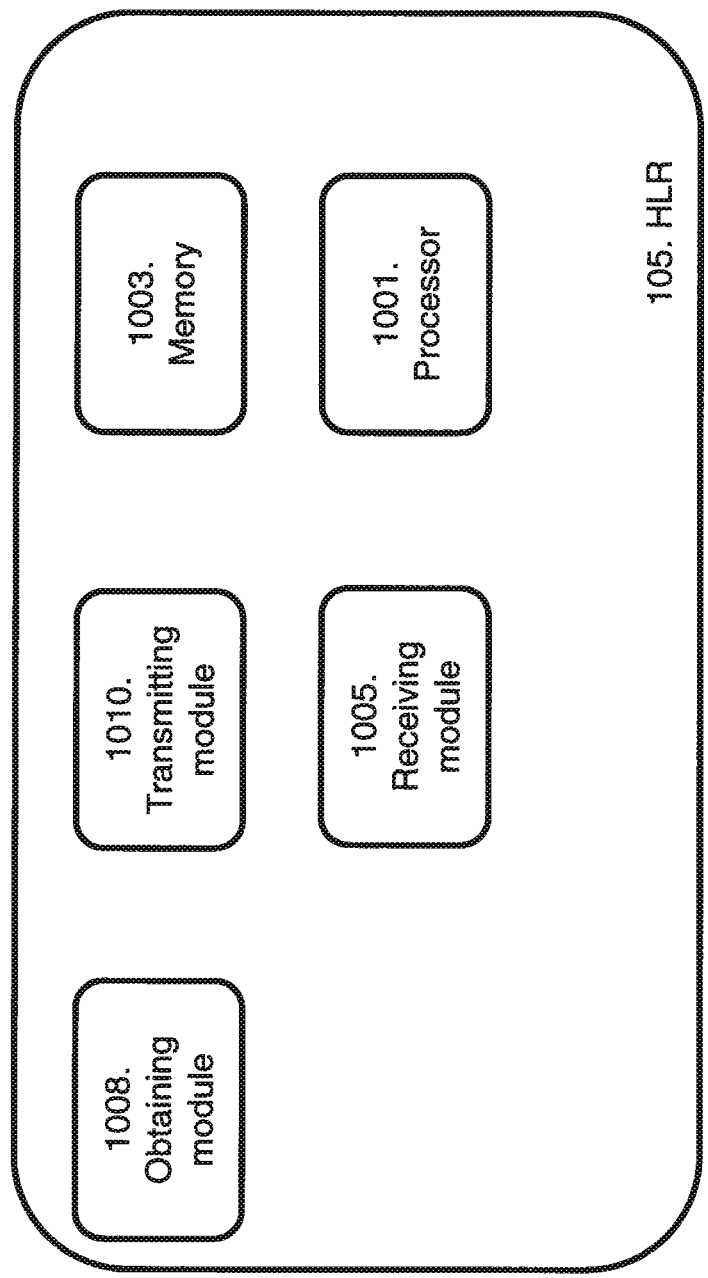
FIG. 10 is a schematic block diagram illustrating embodiments of a HLR.

To perform the method steps shown in FIGS. 2-6 and 9 for enabling authorization of the wireless device 101 to access a first network 100a while simultaneously accessing a second network 100b the HLR 105 may comprise an arrangement as shown in FIG. 10.

The HLR 105 may be adapted to perform any of the steps 304-306 in FIG. 3, any of the steps 404-409 in FIG. 4, any of the steps 504-509 in FIG. 5 and any of the steps 604-609 in FIG. 6. The HLR 105 comprises a processor 1001 which performs any of the above mentioned steps. The processor 1001 may comprise a memory 1003, and the memory 1003 comprises instructions executable by the processor 1001.

The HLR 105 is adapted to, e.g. by means of a receiving module 1005, receive, from the AAA server 103, information associated with the first network 100a which the wireless device 101 has requested to access. Furthermore, receiving module 1005 may be adapted to receive e.g. the messages and information in step 304 in FIG. 3 and the corresponding steps in FIGS. 4, 5 and 6. The receiving module 1005 may also be referred to as a receiving circuit, a transmitting unit, means to receive, receiving means. The receiving module 1005 may be a receiver or a transceiver etc. For instance, the receiving module 1005 may operate using TCP/IP protocol on Ethernet or optical physical access. The received information associated with the first network 100a may be a parameter indicating a radio access type applied by the first network 100a. The received information associated with the first network 100a may indicate that the wireless device 101 requests access to the first network 100a which applies another radio access type compared to the radio access type applied by the second network 100b which the wireless device 101 is already accessing. The received information associated with the first network 100a may indicate that the wireless device 101 is accessing a radio access type which it has not previously accessed. The received information associated with the first network 100a may indicate a type of the node that sends the information associated with the first network 100a. The received information associated with the first network 100a may comprise a request for first network profile data associated with the wireless device 101 in the first network 100a.

The HLR 105 is adapted to, e.g. by means of an obtaining module 1008, based on the received information, obtain network profile data associated with the wireless device 101, e.g. the first network profile data in step 305 in FIG. 3. The HLR 105 may be adapted to obtain the network profile data by creating a network profile data or by updating an existing network profile data. The network profile data may be at least one of a first network profile data associated with the wireless device 101 in the first network 100a and a second network profile data associated with the wireless device 101 in the second network 100b. The HLR 105 may comprise a dual registration of the wireless device 101 when the HLR 105 comprises the first network profile data and the second network profile data. The obtaining module 1008 may also be referred to as an obtaining circuit, an obtaining unit, means to obtain, obtaining means. The obtaining module 1008 may be the processor 1001 of the HLR 105.

The HLR 105 is adapted to, e.g. by means of a transmitting module 1010, transmit, to the AAA server 103, the obtained network profile data. In some embodiments, the transmitting module 1010 is adapted to transmit the message in e.g. step 306 in FIG. 3 and the corresponding steps in FIGS. 4, 5 and 6. The transmitting module 1010 may also be referred to as a transmitting circuit, a transmitting unit, means to transmit, transmitting means. The transmitting module 1010 may be a transmitter or a transceiver etc.

Both the first network 100a and the second network 100b may be updated at subscriber profile data changes associated either with the first network profile data or with the second network profile data when keeping dual registration in the HLR 105.

The HLR 105 may be a central database for a first radio access type applied by the first network 100a and a second radio access type applied by the second network 100b.

In some embodiments, the HLR 105 is adapted to only send a CANCEL_LOCATION message to another node in the second network 100b when the HLR 105 has received an UpdateGPRSLocation message from the second network 100b. In some embodiments, the HLR 105 is adapted to only send a CANCEL_LOCATION message to another node in the first network 100a when the HLR 105 has received an UpdateGPRSLocation message from the first network 100a.

In some embodiments, the first network 100a is a wireless network and the second network 100b is a 3GPP network. In other embodiments, the first network 100a is a 3GPP network and the second network 100b is a wireless network.

As mentioned above, the HLR 105 may comprise a memory 1003 comprising one or more memory units. The memory 1003 is arranged to be used to store data, received data streams, information associated with the first network 100a, profile data, IMSI, threshold values, time periods, configurations, schedulings, and applications to perform the methods herein when being executed in the HLR 105.

Those skilled in the art will also appreciate that the transmitting module 1010, the receiving module 1005, and the obtaining module 1008 described above may refer to a combination of analog and digital circuits, and/or one or more processors configured with software and/or firmware, e.g. stored in a memory, that when executed by the one or more processors such as the processor 1001 perform as described below.

A second computer program product or a computer program may be directly loadable into an internal memory of a digital computer within at least one entity of the HLR (105) according to the above description and as seen in FIG. 10, wherein the second computer program product comprises software code portions for performing the method according to any one of the steps in at least one of the FIGS. 3-6 and 9 when said product is run on a computer.

The second computer program product or a computer program may be stored on a computer usable medium, wherein the second computer program product comprises a computer readable program for causing a computer, within an entity in the HLR (105) according to the above description and as seen in FIG. 10, to control an execution of the method according to any one of the steps seen in at least one of the FIGS. 3-6 and 9.

The present mechanism for authorizing a wireless device 101 to access a first network 100a while simultaneously accessing a second network 100b may be implemented through one or more processors, such as a processor 801 in the AAA server 103 depicted in FIG. 8 and the processor 1001 in the HLR 105 depicted in FIG. 10, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into at least one of the AAA server 103 and the HLR 105. One such carrier may be in the form of a CD ROM disc. It is however feasible with other data carriers such as a memory stick. The computer program code can furthermore be provided as pure program code on a server and downloaded to at least one of the AAA server 103 and the HLR.

Some example embodiment will now be summarized. The AAA server 103 is for enabling authorizing a wireless device to access a first network while simultaneously accessing a second network. The AAA server 103 determines that the wireless device requests access to the first network. The AAA server 103 transmits, to the HLR 105, information associated with the first network. The AAA server 103 receives, from the HLR 105, network profile data associated with the wireless device 101. Based on the received information, the AAA server 103 authorizes the wireless device 101 to access the first network 100a. According to the embodiments herein, the HLR 105 may be used for keeping subscriber registration on both domains (Wi-Fi and 3GPP) as well as keeping Wi-Fi subscriber data profile updated in the same way as it does for 3GPP. According to the embodiments herein, this may be done in a number of different ways. For example, HLR 105 may include subscriber data relevant for access to a first network (e.g., a Wi-Fi network) in the same subscriber profile as is relevant for access to a second network 100b (e.g., WCDMA, GSM).

Alternatively, the HLR 105 may create a specific subscriber profile relevant for access to a first network 00a and keep this subscriber profile separate from the subscriber profile relevant for access to a second network 100b (e.g. GSM, WCDMA etc.).

The HLR 105 may be for enabling authorizing a wireless device to access a first network while simultaneously accessing a second network. The HLR 105 receives, from an AAA server 103, information associated with the first network 100a. Based on the received information, the HLR 105 obtains network profile data associated with the wireless device 101. The HLR 105 transmits, to the AAA server 103, the obtained network profile data.

As mentioned earlier, the AAA server 103 is arranged for enabling authorizing a wireless device 101 to access a first network 100a while simultaneously accessing a second network 100b. The AAA server 103 is arranged to determine that the wireless device 101 requests access to the first network 100a. The AAA server 103 is arranged to transmit, to the HLR 105, information associated with the first network 100a. The AAA server 103 is arranged to receive, from the HLR 105, first network profile data associated with the wireless device 101 in the first network 100a. Based on the received information, the AAA server 103 is arranged to authorize the wireless device 101 to access the first network 100a.

The HLR 105 is arranged for enabling authorizing a wireless device 101 to access a first network 100a while simultaneously accessing a second network 100b. The HLR 105 is arranged to receive, from an AAA server 103, information associated with the first network 100a. Based on the received information, the HLR 105 is arranged to obtain first network profile data associated with the wireless device 101 in the first network 100a. The HLR 105 is arranged to transmit, to the AAA server 103, the obtained first network profile data.

Summarized, the embodiments herein relate to authentication and authorization of access for a wireless device 101 to a first and second network 100a, 100b, such as e.g. a Wi-Fi network and a 3GPP network. More particularly, the embodiments herein relate to how to authorize use of the first network 100a through communication between an AAA server 103 and a HLR 105. The embodiments herein may solve the issue of the HLR 105 automatically sending a CancelLocation request to the registered SGSN 108 or the registered AAA 103 when asked by the AAA 103 or the SGSN 108 for registration. The embodiments herein provide authentication, authorization and dual registration support (3GPP-Wi-Fi) controlled by a single subscriber database (e.g. HLR 105).

Instead of the AAA server 103 mimicking or acting like an SGSN when it aims to retrieve data (send UpdateGPRSLocation) and getting the HLR 105 to send the InsertSubscriberData message to the AAA server 103, a specific AAA indication may be sent towards the HLR 105 (either by means of a new RAT Type or a proprietary extension of UpdateGPRSLocation message or a brand new message).

Upon reception of the above indication, the HLR 105 may create a specific first network profile for the new RAT type, e.g. a specific Wi-Fi profile in case the first network 100a is a Wi-Fi network, that may be handled in the same way as the HLR 105 does currently for the second network profile, e.g. a 2G or 3G profile. That is, any update into the Wi-Fi subscriber related data may be notified towards the AAA server 103 by means of InsertSubscriberData message.

With the embodiments herein, there will be no cancelLocation message (the messages in steps 208 and 209 seen in FIG. 2) sent from the HLR 105 to the serving SGSN 108 upon AAA registration (so there will be no Release procedure on the 3GPP side as a consequence of authorization of a wireless device 101 in the Wi-Fi RAT, and vice versa, no release procedure on the Wi-Fi side as a consequence of wireless device 101 attachment in 3GPP access network). By keeping dual registration in the HLR 105, both networks (e.g. 3GPP and Wi-Fi) may be updated properly at subscriber profile data changes.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods may, without departing from the embodiments herein, be performed in another order than the order in which they appear in this document.

The invention claimed is:

1. A method performed by an Authentication, Authorization and Accounting (AAA) server for enabling authorization of a wireless device to access a first network while simultaneously accessing a second network which the wireless device is currently accessing, the method comprising:
the AAA server sending to a Home Location Register (HLR) an authentication request comprising a wireless device identifier identifying the wireless device;
the AAA server receiving an authentication response transmitted by the HLR in response to the authentication request;
the AAA server, in response to receiving the authentication response transmitted by the HLR in response to the authentication request, transmitting to the HLR a profile request message requesting network profile data associated with the wireless device;
the AAA server receiving, from the HLR, the requested network profile data associated with the wireless device;
the AAA server, based on the received network profile data, authorizing the wireless device to access the first network; and
the AAA server transmitting, to the wireless device, information indicating the authorization to access the first network.

2. The method according to claim 1, wherein the profile request message is a location update message that comprises a parameter indicating a radio access technology (RAT) used by the first network to communicate with the wireless device.

3. The method according to claim 2, wherein the location update message is a MAP_UPDATE_GPRS_LOCATION request message.

4. The method according to claim 1, wherein the profile request message is a location update message that comprises an AAA flag.

5. The method according to claim 4, the location update message is a MAP_UPDATE_GPRS_LOCATION request message and the AAA flag is contained in a Extension Container of the MAP_UPDATE_GPRS_LOCATION message.

6. The method according to claim 1, wherein the profile request message is a dedicated for request profile information.

7. The method according to claim 1, further comprising:
the AAA server sending to the wireless device an Extensible Authentication Protocol (EAP) Request prior to sending the authentication request to the HLR; and
the AAA server receiving an EAP Response message transmitted by the wireless device in response to the wireless device receiving the EAP Request message, wherein
the AAA server transmits the authentication request to the HLR in response to receiving the EAP Response.

8. The method according to claim 1, further comprising:
the AAA server receiving a first message transmitted by the wireless, wherein the AAA server receives the first message prior to sending to the HLR the authentication request and the first message comprises a wireless device identifier identifying the wireless device;
in response to receiving the first message, the AAA server sending a request to the mobile device; and
the AAA server receiving a second message transmitted by the wireless device in response to the request transmitted by the AAA server, wherein
the AAA server transmits the authentication request to the HLR in response to receiving the second message that was transmitted by the wireless device in response to the request transmitted by the AAA server.

9. The method according to claim 1, wherein the first network is a wireless local area network and the second network is a 3GPP network, or wherein the first network is a 3GPP network and the second network is a wireless local area network.

10. A method performed by a Home Location Register (HLR) for enabling authorization of a wireless device to access a first network while simultaneously accessing a second network which the wireless device is currently accessing, the method comprising:
the HLR receiving, from an Authentication, Authorization and Accounting (AAA) server, a location update message comprising i) a device identifier identifying the wireless device and ii) information associated with the first network which the wireless device has requested to access, wherein the HLR receives the location update message while the wireless device is registered with and is being served by a network node in the second network;

based on the device identifier, obtaining network profile data associated with the wireless device; and transmitting, to the AAA server, the obtained network profile data, wherein the HLR is configured such that, as a result of receiving the location update message, the HLR refrains from transmitting a Cancel Location message to the network node serving the wireless device in the second network.

11. The method according to claim 10, wherein the HLR obtains the network profile data by creating a network profile data or by updating an existing network profile data.

12. The method according to claim 10, wherein the network profile data is at least one of a first network profile data associated with the wireless device in the first network and a second network profile data associated with the wireless device in the second network.

13. The method according to claim 12, wherein the HLR comprises a dual registration of the wireless device when the HLR comprises the first network profile data and the second network profile data.

14. The method according to claim 13, wherein both the first network and the second network are updated at subscriber profile data changes associated either with the first network profile data or with the second network profile data when keeping dual registration in the HLR.

15. The method according to claim 10, wherein the received information associated with the first network is a parameter indicating a radio access type applied by the first network.

16. The method according to claim 10, wherein the received information associated with the first network indicates that the wireless device requests access to the first network which applies another radio access type compared to the radio access type applied by the second network which the wireless device is already accessing.

17. The method according to claim 10, wherein the received information associated with the first network indicates that the wireless device is accessing a radio access type which it has not previously accessed.

18. The method according to claim 10, wherein the received information associated with the first network indicates a type of the node that sends the information associated with the first network.

19. The method according to claim 10, wherein the HLR is a central database for a first radio access type applied by the first network and a second radio access type applied by the second network.

20. The method according to claim 10, wherein a CANCEL_LOCATION message is only sent to another node in the second network when the HLR has received an UpdateGPRSLocation message from the second network.

21. The method according to claim 10, wherein a CANCEL_LOCATION message is only sent to another node in the first network when the HLR has received an UpdateGPRSLocation message from the first network.

22. The method according to claim 10, wherein the first network is a wireless network and the second network is a 3GPP network, or
wherein the first network is a 3GPP network and the second network is a wireless network.

23. An Authentication, Authorization and Accounting (AAA) server for enabling authorization of a wireless device to access a first network while simultaneously accessing a second network which the wireless device is currently accessing, the AAA server being adapted to:

send to a Home Location Register (HLR) an authentication request comprising a wireless device identifier identifying the wireless device;

obtain an authentication response transmitted by the HLR in response to the authentication request;

in response to obtaining the authentication response, transmit to the HLR a profile request message requesting network profile data associated with the wireless device;

obtain, from the HLR, the requested network profile data associated with the wireless device;

based on the obtained network profile data, authorize the wireless device to access the first network; and transmit, to the wireless device, information indicating the authorization to access the first network.

24. The AAA server according to claim 23, wherein the first network is a wireless network and the second network is a 3GPP network, or
wherein the first network is a 3GPP network and the second network is a wireless network.

25. The AAA server of claim 23, wherein the profile request message is a location update message that comprises a parameter indicating a radio access technology (RAT) used by the first network to communicate with the wireless device.

26. The AAA server of claim 25, wherein the location update message is a MAP_UPDATE_GPRS_LOCATION request message.

27. The AAA server of claim 23, wherein the profile request message is a location update message that comprises an AAA flag.

28. The AAA server of claim 27, the location update message is a MAP_UPDATE_GPRS_LOCATION request message and the AAA flag is contained in a Extension Container of the MAP_UPDATE_GPRS_LOCATION message.

29. The AAA server of claim 23, wherein the profile request message is a dedicated for request profile information.

30. The AAA server of claim 23, wherein the AAA server is further configured to:

send to the wireless device an Extensible Authentication Protocol (EAP) Request prior to sending the authentication request to the HLR; and obtain an EAP Response message transmitted by the wireless device in response to the wireless device receiving the EAP Request message, wherein the AAA server is configured to transmit the authentication request to the HLR in response to receiving the EAP Response.

31. The AAA server of claim 23, wherein the AAA server is further configured to:

obtain a first message transmitted by the wireless, wherein the AAA server obtains the first message prior to sending to the HLR the authentication request and the first message comprises a wireless device identifier identifying the wireless device;

in response to obtaining the first message, send a request to the mobile device; and obtain a second message transmitted by the wireless device in response to the request transmitted by the AAA server, wherein the AAA server is configured to transmit the authentication request to the HLR in response to receiving the second message that was transmitted by the wireless device in response to the request transmitted by the AAA server.

32. A Home Location Register (HRL) for enabling authorization of a wireless device to access a first network while simultaneously accessing a second network which the wireless device is currently accessing, the HLR being adapted to:
obtain, from an Authentication, Authorization and Accounting (AAA) server, a location update message comprising i) a device identifier identifying the wireless device and ii) information associated with the first network which the wireless device has requested to access, wherein the HLR receives the location update message while the wireless device is registered with and is being served by a network node in the second network;
based on the device identifier, obtain network profile data associated with the wireless device; and
transmit, to the AAA server, the obtained network profile data, wherein
the HLR is configured such that, as a result of receiving the location update message, the HLR refrains from transmitting a Cancel Location message to the network node serving the wireless device in the second network.

33. The HLR according to claim 32, wherein the HLR is adapted to obtain the network profile data by creating a network profile data or by updating an existing network profile data.

34. The HLR according to claim 32, wherein the network profile data is at least one of a first network profile data associated with the wireless device in the first network and a second network profile data associated with the wireless device in the second network.

35. The HLR according to claim 34, wherein the HLR is adapted to comprise a dual registration of the wireless device when the HLR comprises the first network profile data and the second network profile data.

36. The HLR according to claim 35, wherein both the first network and the second network are updated at subscriber profile data changes associated either with the first network profile data or with the second network profile data when keeping dual registration in the HLR.

37. The HLR according to claim 32, wherein the received information associated with the first network is a parameter indicating a radio access type applied by the first network.

38. The HLR according to claim 32, wherein the received information associated with the first network indicates that the wireless device requests access to the first network which applies another radio access type compared to the radio access type applied by the second network which the wireless device is already accessing.

39. The HLR according to claim 32, wherein the received information associated with the first network indicates that the wireless device is accessing a radio access type which it has not previously accessed.

40. The HLR according to claim 32, wherein the received information associated with the first network indicates a type of the node that sends the information associated with the first network.

41. The HLR according to claim 32, wherein the HLR is a central database for a first radio access type applied by the first network and a second radio access type applied by the second network.

42. The HLR according to claim 32, wherein the HLR is adapted to only send a CANCEL_LOCATION message to another node in the second network when the HLR has received an UpdateGPRSLocation message from the second network.

43. The HLR according to claim 32, wherein the HLR is adapted to only send a CANCEL_LOCATION message to another node in the first network when the HLR has received an UpdateGPRSLocation message from the first network.

44. The HLR according to claim 32, wherein the first network is a wireless network and the second network is a 3GPP network, or
wherein the first network is a 3GPP network and the second network is a wireless network.

45. A computer program product comprising a non-transitory computer readable medium storing computer instructions for:
sending to a Home Location Register (HLR) an authentication request comprising a wireless device identifier identifying the wireless device;
receiving an authentication response transmitted by the HLR in response to the authentication request;
in response to receiving the authentication response, transmitting to the HLR a profile request message requesting network profile data associated with the wireless device;
receiving, from the HLR, the requested network profile data associated with the wireless device;
based on the received network profile data, authorizing the wireless device to access the first network; and
transmitting, to the wireless device, information indicating the authorization to access the first network.

46. A computer program product comprising a non-transitory computer readable medium storing computer instructions for:
receiving, from an Authentication, Authorization and Accounting (AAA) server, a location update message comprising i) a device identifier identifying the wireless device and ii) information associated with the first network which the wireless device has requested to access, wherein the HLR receives the location update message while the wireless device is registered with and is being served by a network node in the second network;
based on the device identifier, obtaining network profile data associated with the wireless device;
transmitting, to the AAA server, the obtained network profile data; and
as a result of receiving the location update message, refraining from transmitting a Cancel Location message to the network node serving the wireless device in the second network.

* * * * *